(12) United States Patent
Fulger et al.

(10) Patent No.: US 9,792,816 B2
(45) Date of Patent: Oct. 17, 2017

(54) MOBILE DEVICE AND METHOD AND SYSTEM FOR TRANSMISSION OF DATA THERETO

(75) Inventors: Daniel Fulger, Duisburg (DE); Peter Mieth, Berlin (DE); Steffen Gunther Wiesner, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 0 days.

(21) Appl. No.: 13/884,037

(22) PCT Filed: Nov. 8, 2011

(86) PCT No.: PCT/EP2011/069658
§ 371 (c)(1),
(2), (4) Date: Jul. 22, 2013

(87) PCT Pub. No.: WO2012/062762
PCT Pub. Date: May 18, 2012

(65) Prior Publication Data
US 2014/0018106 A1    Jan. 16, 2014

(30) Foreign Application Priority Data

Nov. 8, 2010 (GB) .................................. 1018815.9
Sep. 30, 2011 (GB) .................................. 1116926.5
Sep. 30, 2011 (GB) .................................. 1116927.3

(51) Int. Cl.
H04W 4/02      (2009.01)
G08G 1/0967    (2006.01)
G01C 21/34     (2006.01)
G01C 21/36     (2006.01)
(Continued)

(52) U.S. Cl.
CPC ... *G08G 1/096775* (2013.01); *G01C 21/3415* (2013.01); *G01C 21/3453* (2013.01);
(Continued)

(58) Field of Classification Search
CPC ..................................................... H04W 4/02
(Continued)

(56) References Cited

U.S. PATENT DOCUMENTS 5,363,107 A    11/1994 Gertz et al.
5,913,917 A    6/1999  Murphy
(Continued)

FOREIGN PATENT DOCUMENTS

CN    1434946 A    8/2003
CN    101479733 A  7/2009
(Continued)

OTHER PUBLICATIONS

International Search Report issued Jun. 6, 2012 for International Application No. PCT/EP2011/069658.
Liévin M'Bu: "Interaktive Wetterinformationenfürs Handy", IT-Solutions Wetterinformationssysteme, Jan. 1, 2009 (Jan. 1, 2009), XP002669833, Retrieved from the Internet: URL:http://www.ergon.ch/fileadmin/doc/MeteoSchweiz_Red.pdf [retrieved on Feb. 16, 2012].

*Primary Examiner* — Todd Melton
*Assistant Examiner* — Jason Roberson

(57) ABSTRACT

A server system 150 for providing data to at least one mobile device 200, the server system comprising a processing resource 174. In a first embodiment, the processing resource 174 is configured to generate contour data representing a boundary of a respective area for which a weather-related parameter has substantially the same value, the contour data being sent to a mobile device 200. In a second embodiment, the processing resource 174 is configured to determine a plurality of parameter values of a model representative of weather-related data, and to filter the parameter values such that only some of the values of sent to a mobile device 200.

25 Claims, 9 Drawing Sheets

(51) Int. Cl.
*G08G 1/0968* (2006.01)
*H04L 29/08* (2006.01)

(52) U.S. Cl.
CPC ..... *G01C 21/3492* (2013.01); *G01C 21/3691* (2013.01); *G08G 1/0967* (2013.01); *G08G 1/096827* (2013.01); *G08G 1/096844* (2013.01); *H04L 67/18* (2013.01); *H04W 4/02* (2013.01)

(58) Field of Classification Search
USPC .......... 701/117, 118, 119, 416, 423
See application file for complete search history.

(56) References Cited

U.S. PATENT DOCUMENTS

| | | | |
|---|---|---|---|
| 6,317,686 B1* | 11/2001 | Ran | 701/533 |
| 6,933,860 B1* | 8/2005 | Gehman | G08G 1/0104 |
| | | | 340/995.1 |
| 2004/0225437 A1 | 11/2004 | Endo et al. | |
| 2004/0239550 A1* | 12/2004 | Daly, Jr. | 342/26 B |
| 2009/0088965 A1* | 4/2009 | Burckart | G01C 21/3492 |
| | | | 701/533 |
| 2010/0161222 A1 | 6/2010 | Zhang | |

FOREIGN PATENT DOCUMENTS

| | | |
|---|---|---|
| CN | 101836079 A | 9/2010 |
| DE | 10139668 A1 | 2/2003 |
| DE | 102007016978 A1 | 10/2008 |
| DE | 102007037938 A1 | 2/2009 |
| GB | 2445270 A | 7/2008 |
| JP | H10260267 A | 9/1998 |
| JP | 2000131458 A | 5/2000 |
| JP | 2000258174 A | 9/2000 |
| JP | 2001281352 A | 10/2001 |
| JP | 2002156236 A | 5/2002 |
| WO | 0208922 A1 | 1/2002 |

* cited by examiner

MOBILE DEVICE AND METHOD AND SYSTEM FOR TRANSMISSION OF DATA THERETO

CROSS-REFERENCES TO RELATED APPLICATIONS

This application is the National Stage of International Application No. PCT/EP2011/069658 filed Nov. 8, 2011 and designating the United States. The application claims priority under 35 U.S.C. §119 to United Kingdom Patent Application No. 1018815.9 filed Nov. 8, 2010, United Kingdom Patent Application No. 1116927.3 filed Sep. 30, 2011, and United Kingdom Patent Application No. 1116926.5 filed Sep. 30, 2011. The entire contents of these applications are incorporated herein by reference.

FIELD OF THE INVENTION

The present invention relates to a mobile device and to a system and method for providing data to the mobile device.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems. Examples of known PNDs include the GO LIVE 1005 model manufactured and supplied by TomTom International B.V.

The utility of such PNDs is manifested primarily in their ability to determine a route between a first location (usually a start or current location) and a second location (usually a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favorite or recently visited destinations.

The PND determines the route based upon stored geographical data, usually in the form of a digital map. The stored geographical data can include data concerning a wide variety of features, for example the position and characteristics of roads or other thoroughfares, the position and characteristics of points of interest, and the position and characteristics of geographical features, for example rivers, coastlines, or mountains.

In operation, most PNDs periodically log their own position as a function of time, for example every five seconds. PNDs can also log other, associated data such as speed or direction of travel as a function of time. The data logged by PNDs or other portable computing devices, can be referred to as probe data. It is known to obtain probe data from a large number of PNDs or other portable computing devices, and to process the probe data in order to verify or supplement existing geographical data, for example existing digital maps.

Roads or other routes can be represented in a digital map by separate segments. The digital map can include speed data that represents the expected speed of travel over each segment of a road or other route. Such speed data is obtained from expected average travel speeds over roads of different types or is obtained from probe data representing actual travel of large numbers of vehicles over each road or other route in the digital map.

The speed data can be used in known systems to determine the fastest route to a particular destination, to plan routes and/or to determine an estimated time of arrival (ETAS) at the destination. An example of a system that uses speed data in such a way is the IQ Routes® system produced by TomTom International B.V.

Whilst speed data can be used to calculate preferred routes and ETAs, the accuracy of such calculations can be hindered due to the unpredictability of traffic. Speed profiles obtained from probe data usually represent long term averages, averaged over periods longer than many types of traffic fluctuations. Local short-lived events or fluctuations of traffic can invalidate, or render inaccurate, a specific speed profile of a road segment. For example, one such event is bad weather, which can easily double ETAs.

It is known, e.g. from US 2010/00161222, to transmit weather data to a navigation device, and to plan driving routes to avoid any region that has a weather condition higher than a threshold value. However, the transmission of weather data or weather-related data to PNDs is restricted by the low bandwidth that is available for transmission of data to many such devices, and the large amount of data that is needed to adequately represent weather conditions over a large area.

Similarly, the transmission of weather data or other data representative of the variation of a parameter as a function of location over a region to other mobile devices, for example mobile phones or PNDs, is restricted due to the large size of the data and the limited bandwidth that can be available in practice. The limited bandwidth makes it difficult to provide for display of, for example, weather movies on PNDs, mobile phones or other mobile devices, particularly if the weather or other data is updated on a regular basis.

SUMMARY OF THE INVENTION

In a first aspect of the invention there is provided a mobile device comprising a communication resource for receiving at least one data set that represents a value of a parameter as a function of location; a processing resource for processing the at least one data set, wherein the at least one data set comprises contour data that represents at least one contour, the or each contour representing a boundary of a respective area for which the parameter has substantially the same value; and the processing resource is configured to process the contour data to determine the value of the parameter for at least one location.

By receiving and processing contour data, the amount of data transmitted to the device can be reduced whilst retaining desired information. That can be particularly valuable in the context of transmission of data to the device via a bandwidth limited link, particularly if the data is subject to regular update.

The parameter may comprise a weather-related parameter, for example representing at least one of presence or amount of precipitation, for example rain, hail sleet or snow; wind speed and/or direction; presence or amount of lying snow; presence or amount of ice; level of visibility; presence or amount of fog; temperature; presence or absence of cloud. The use of contour data has been found to be particularly valuable in relation to weather data.

The parameter may additionally or alternatively represent a speed modification parameter representative of an expected modification in speed due to weather or other environmental conditions. The speed modification parameter can be used to modify an average speed of travel associated with a road segment within a digital map.

The contour data may represent the or each contour as a polygon and optionally, the contour data for the polygon comprises the co-ordinates of the vertices or edges of the polygon. Alternatively the contour data can represent the or each contour as any other suitable shape, for example an ellipse.

The at least one data set may comprise a plurality of data sets, each data set representative of the value of the parameter as a function of location at a respective, different time, and each data set comprising contour data. The plurality of data sets may represent actual or forecast weather data at a plurality of different times.

Each data set may comprise at least one contour identifier, each contour identifier identifying respective contour data, and optionally the processing resource is configured to determine using the at least one contour identifier contour data in the or a second image data set that corresponds to contour data in the or a first image data set. Thus, contours can be tracked between data sets.

The processing resource may be configured to process each data set to generate a corresponding image frame, wherein each image frame represents the parameter as a function of location at a respective, different time.

The processing resource may be configured to provide the image frames to a display device for display of the image frames in sequence.

The parameter may comprise a weather-related parameter, and the image frames may be for display as a weather movie.

The processing resource may be configured to interpolate contour data from a first of the image data sets representative of the value of the parameter as a function of location at a first time, and corresponding contour data from a second of the image data sets representative of the value of the parameter as a function of location at a second, different time.

The processing resource may be configured to obtain, from the interpolation, interpolated data corresponding to a third time between the first time and the second time. The interpolated data may comprise or be used to obtain a further image frame representing the parameter as a function of location at the third time.

Alternatively, or additionally, the processing resource may be configured to extrapolate contour data for a first time to obtain contour data for a further time.

The mobile device may comprise a mobile phone, a portable navigation device or a portable computer.

In a further aspect of the invention there is provided a server system for providing data to at least one mobile device, the server system comprising: a processing resource configured to obtain data that represents the variation of a parameter as a function of location, and to process the data to generate at least one data set representative of the data for transmission to the at least one mobile device; and a communications resource for transmitting the at least one data set to the at least one mobile device, wherein: the processing resource is configured to determine from the data at least one contour that represents a boundary of a respective area for which the parameter has substantially the same value, and to generate contour data representing the at least one contour, the data set comprising the contour data. The data may comprise frame data and/or pixel data.

The parameter may comprise a weather-related parameter, for example representing at least one of presence or amount of precipitation, for example rain, hail sleet or snow; wind speed and/or direction; presence or amount of lying snow; presence or amount of ice; level of visibility; presence or amount of fog; temperature; presence or absence of cloud.

The parameter may additionally or alternatively comprise a speed modification parameter representative of an expected modification in speed due to weather or other environmental conditions.

The obtained data may represent the variation of the parameter as a function of location at a plurality of different times, and the processing resource may be configured to process the data to obtain a plurality of data sets, each data set representing the variation of the parameter as a function of location at a respective, different time.

The processing resource may be configured to compare contour data for a first one of the data sets representative of the value of the parameter as a function of location at a first time and a second one of the data sets representative of the value of the parameter as a function of location at a second time, and to identify contour data in the second data set representing a contour that corresponds to a contour represented by contour data in the second data set.

The processing resource may be configured to include contour identifiers in the data sets that identify the corresponding contours.

The processing resource may be configured to compare at least one of shape, size, position or overlap of at least one contour of the first data set and at least one contour of the second data set to determine corresponding contours.

The processing resource may be configured to determine expected movement or other change of the contours between the first time and the second time The parameter may represent an environmental condition, for example a weather condition.

Each contour may represent a boundary of a respective area for which the environmental condition is substantially the same.

The processing resource may be configured to determine expected movement or other change of the contours between the first time and the second time based on predicted or actual wind speed and/or wind direction.

The processing resource may be configured to identify a contour represented by contour data in the first data set for which there is not a corresponding contour represented by contour data in the second data set, to assign a location and/or time for the appearance or disappearance of the contour, and to store an identifier representative of the location and/or time of appearance or disappearance.

The identifier, for example a location identifier, may be stored in or with the first or second data set.

The location of appearance or disappearance of the contour may be determined in dependence on expected movement or other change of the contours between the first time and the second time.

The parameter may represent an environmental condition, for example a weather condition, each contour may represent a boundary of a respective area for which the environmental condition is substantially the same, and the processing resource may be configured to determine expected movement or other change of the contours between the first time and the second time based on predicted or actual wind speed and/or wind direction.

The processing resource may be configured to obtain the plurality of data sets, to determine changes in the contour data between data sets, and to select some of the data sets for transmission to the at least one mobile device in dependence on the determined changes between data sets.

The processing resource may be configured to omit a data set if changes in the contour data between the data set and a preceding data set, or between data set and a subsequent data set, are below a predetermined level.

The processing resource may be configured to select data sets to ensure that no contours both appear and disappear from the plurality of data sets at times between consecutive selected data sets.

In a further aspect of the invention there is provided a system for providing datasets representative of the variation of a parameter with location, comprising at least one mobile device as claimed or described herein and a server system as claimed or described herein.

In another aspect of the invention there is provided a method of processing data at a mobile device, comprising receiving at least one data set that represents a value of a parameter as a function of location, wherein the at least one data set comprises contour data that represents at least one contour, the or each contour representing a boundary of a respective area for which the parameter has substantially the same value; and the method comprises processing the contour data to determine the value of the parameter for at least one location.

The parameter may comprise a weather-related parameter, for example representing at least one of presence or amount of precipitation, for example rain, hail sleet or snow; wind speed and/or direction; presence or amount of lying snow; presence or amount of ice; level of visibility; presence or amount of fog; temperature; presence or absence of cloud.

The parameter may represent a speed modification parameter representative of an expected modification in speed due to weather or other environmental conditions.

The contour data may represent the or each contour as a polygon and optionally, the contour data for the polygon comprises the co-ordinates of the vertices or edges of the polygon.

The at least one data set may comprise a plurality of data sets, each data set representative of the value of the parameter as a function of location at a respective, different time, and each data set comprising contour data.

Each data set may comprise at least one contour identifier, each contour identifier identifying respective contour data, and optionally the method comprises determining using the at least one contour identifier contour data in the or a second image data set that corresponds to contour data in the or a first image data set.

The method may comprise processing each data set to generate a corresponding image frame, wherein each image frame represents the parameter as a function of location at a respective, different time.

The method may comprise providing the image frames to a display device for display of the image frames in sequence. The parameter may comprise a weather-related parameter, and the image frames may be for display as a weather movie.

The method may comprise interpolating contour data from a first of the image data sets representative of the value of the parameter as a function of location at a first time, and corresponding contour data from a second of the image data sets representative of the value of the parameter as a function of location at a second, different time.

The method may comprise obtaining, from the interpolation, interpolated data corresponding to a third time between the first time and the second time.

In another aspect of the invention there is provided a method of providing data to at least one mobile device, comprising obtaining data that represents the value of a parameter as a function of location; processing the data to generate at least one data set representative of the data for transmission to the at least one mobile device, wherein the processing of the data comprises determining from the data at least one contour that represents a boundary of a respective area for which the parameter has substantially the same value, and generating contour data representing the at least one contour.

The data may represent the variation of the parameter as a function of location at a plurality of different times, and the method may comprise processing the data to obtain a plurality of data sets, each data set representing the variation of the parameter as a function of location at a respective, different time.

The method may comprise comparing contour data for a first one of the data sets representative of the value of the parameter as a function of location at a first time and a second one of the data sets representative of the value of the parameter as a function of location at a second time, and identifying contour data in the second data set representing a contour that corresponds to a contour represented by contour data in the second data set.

The method may comprise including contour identifiers in the data sets that identify the corresponding contours.

The method may comprise comparing at least one of shape, size, position or overlap of at least one contour of the first data set and at least one contour of the second data set to determine corresponding contours.

The method may comprise determining expected movement or other change of the contours between the first time and the second time The parameter may represent an environmental condition, for example a weather condition, each contour may represents a boundary of a respective area for which the environmental condition is substantially the same, and the method may comprise determining expected movement or other change of the contours between the first time and the second time based on predicted or actual wind speed and/or wind direction.

The method may comprise identifying a contour represented by contour data in the first data set for which there is not a corresponding contour represented by contour data in the second data set, to assign a location and/or time for the appearance or disappearance of the contour, and to store an identifier representative of the location and/or time of appearance or disappearance.

The method may comprise determining the location of appearance or disappearance of the contour in dependence on expected movement or other change of the contours between the first time and the second time.

The method may comprise obtaining the plurality of data sets, determining changes in the contour data between data sets, selecting some of the data sets for transmission to the at least one mobile device in dependence on the determined changes between data sets.

The method may comprise omitting a data set if changes in the contour data between the data set and a preceding data set, or between data set and a subsequent data set, are below a predetermined level.

The method may comprise selecting data sets to ensure that no contours both appear and disappear from the plurality of data sets at times between consecutive selected data sets.

In a further aspect of the invention there is provided a server system for providing data to at least one mobile device, the server system comprising: a processing resource configured to model a data set representing variation of a variable as a function of location, the modelling comprising determining a plurality of parameter values of a model that comprises at least one function; and a communications resource for transmitting parameter values to the mobile device.

The processing resource may be configured to combine a plurality of data sets to produce a combined data set, and the modelling may comprise modelling the combined data set to determine the plurality of parameter values.

Each data set may be a two-dimensional data set, the combined data set may be a three-dimensional data set, and the modelling may comprise modelling the three dimensional combined data set.

Each of the plurality of data sets may comprise a frame, for example an image frame, representative of the variation of the variable as a function of location at a respective different time.

The or each data set may comprise weather-related data or other environmental data, for example data representative of actual or expected weather conditions as a function of location, the weather conditions comprising, for example, one or more of presence or amount of precipitation, for example rain, hail sleet or snow; wind speed and/or direction; presence or amount of lying snow; presence or amount of ice; level of visibility; presence or amount of fog; temperature; presence or absence of cloud.

The data may comprise speed modification data representative of an actual or expected modification in speed. The three dimensional data set may be representative of a weather movie.

The processing resource may be configured to perform a filtering process to reduce the number of parameter values to be transmitted to the mobile device.

The processing resource may be configured to select at least one of the determined parameter values and to omit the selected at least one parameter value from the plurality of parameter values for transmission to the mobile device.

The processing resource may be configured to compare the magnitude of each parameter value to a threshold and to select at least one parameter value for omission in dependence on the comparison.

The plurality of parameter values may comprise a series of parameter values and the processing resource may be configured to truncate the series of parameter values.

Modelling the data set may comprise fitting the data set to the at least one function, and optionally the at least one function comprises at least one Gaussian function.

The fitting may comprise fitting the data set to a linear superposition of a fixed or variable number of Gaussian or other functions, for example three-dimensional Gaussian or other functions. Each function may comprise a multivariate Gaussian or other function with a fixed or variable covariance matrix.

Alternatively or additionally the fitting may comprise fitting the data set to at least one Fourier or wavelet function.

Modelling the data set may comprise performing a transform, and optionally the transform comprises a Fourier transform or a wavelet transform.

The at least one parameter value may comprise a plurality of Fourier coefficients or a plurality of wavelet coefficients.

The processing resource may be configured to select a range of values of location and to select data within that range of values of location for inclusion in the data set to be modelled.

The communications resource may be operable to receive, for example from the mobile device, location data identifying at least one location and the processing resource is configured to select the range of values of location in dependence on the identified location.

The processing resource may be configured to select the range of values of location so that the at least one identified location is within the range. The location data may comprise route data representative of a route to a destination. The processing resource may be configured to select the range of values of location so that the route is within the selected range.

The processing resource may be configured to select the size of the range of values of position in dependence on a desired zoom level.

The communications resource may be configured to receive, for example from the mobile device, zoom level data representative of the desired zoom level.

The processing resource may be configured to model a plurality of data sets or combined data sets, each data set or combined data set representative of the variation of a variable as a function of location for a respective, different area of a plurality of areas, thereby to obtain a set of parameter values in respect of each area.

The plurality of areas may comprise at least one sub-set of areas that tile a region.

The plurality of areas may comprise at least two sub-sets of areas, each sub-set of areas tiling the region, and the size of the areas for a first of the sub-sets of areas is different from the size of the areas for the second sub-set of areas.

The processing resource may be configured to select at least one set of parameter values for transmission to the mobile device in dependence on the identified location and/or in dependence on the desired zoom level.

In a further aspect of the invention there is provided a mobile device comprising: a communication resource for receiving data; and a processing resource for processing the received data, wherein: the received data comprises a plurality of model parameter values and the processing resource is configured to process the model parameter values to determine the value of a location-dependent variable for at least one location and/or at least one time.

The processing resource may be configured to process the model parameter values to generate at least one data set representing the value of the location-dependent variable for locations across an area, and optionally the or each extracted data set comprises a frame, for example an image frame.

The plurality of model parameter values may represent three dimensional data and the or each generated data set may be a two-dimensional data set, for example a data set representing a slice through the three dimensional data.

The device may further comprise a display and the processing resource may be configured to generate an image or sequence of images on the display from the data set or plurality of data sets. The sequence of images may comprise a movie, for example a weather movie.

The variable may comprise a weather-related variable, for example representative of expected weather conditions as a function of location, the weather conditions comprising, for example, one or more of presence or amount of precipitation, for example rain, hail sleet or snow; wind speed and/or direction; presence or amount of lying snow; presence or amount of ice; level of visibility; presence or amount of fog; temperature; presence or absence of cloud.

The variable may be representative of an actual or expected modification in speed due to weather conditions.

The processing of the parameter values by the processing resource may comprise determining the value of at least one function using the parameter values, wherein optionally the at least one function comprises at least one Gaussian function.

The processing of the parameter values by the processing resource may comprise performing an inverse transform using the parameter values, and optionally the inverse transform may comprise a Fourier transform or a wavelet transform.

The communications resource may be operable to receive a plurality of sets of parameter values. The processing resource may be configured to extract a respective data set from each set of parameter values and to combine those data sets to produce a combined data set.

Each extracted data set may represent an image for a respective different area, and the combining of the data sets by the processing resource may comprise performing an image stitching process in respect of the images represented by the data sets.

In a further aspect of the invention there is provided a system comprising a server system as claimed or described herein and a mobile device as claimed or described herein.

In another aspect of the invention there is provided a method of providing data to at least one mobile device, comprising modelling a data set representing variation of a variable as a function of location, the modelling comprising using a model comprising at least one function thereby to determine a plurality of parameter values; and transmitting the determined parameter values to the mobile device.

In a further aspect of the invention there is provided a method of obtaining determining location-dependent parameter data at a mobile device, comprising receiving data comprising a plurality of model parameter values and processing the model parameter values to determine the value of a location-dependent variable for at least one location and/or at least one time.

In another aspect of the invention there is provided a computer program product comprising computer-readable instructions that are executable to perform a method as claimed or described herein.

There may also be provided an apparatus or method substantially as described herein with reference to the accompanying drawings.

Any feature or aspect of the invention may be combined with any other feature or aspect of the invention, in any appropriate combination. Apparatus features may be applied as method features and vice versa.

DETAILED DESCRIPTION OF EMBODIMENTS

Embodiments of the invention are now described, by way of non-limiting example, and are illustrated in the following figures, in which:

FIG. 11b is a plot representing selected Fourier coefficients obtained from a Fourier transform procedure performed on the data represented in FIG. 11a;

FIG. 12b is a plot representing the selected Fourier coefficients that were processed to obtain the plot of FIG. 12a;

Embodiments described herein can be used to transmit data to mobile devices in an efficient manner, and can be particularly useful in the context of the transmission of weather data to, and for example the display of weather movies on, a mobile device. In a first embodiment, data is transmitted in the form of contour data, while in a second embodiment data is firstly processed to determine a plurality of parameter values of a model, and the parameter values or a subset thereof are transmitted. Embodiments are not limited to the display of weather movies, or the transmission of weather data, and can be used for the transmission of any suitable type of data to any suitable type of device. For example, a further embodiment is described herein in which the effect of weather conditions on expected speed of travel is determined and the data transmitted to the mobile devices comprises speed data which is used by the mobile devices to determine or modify routes to a destination and/or ETAs.

Figure 1:
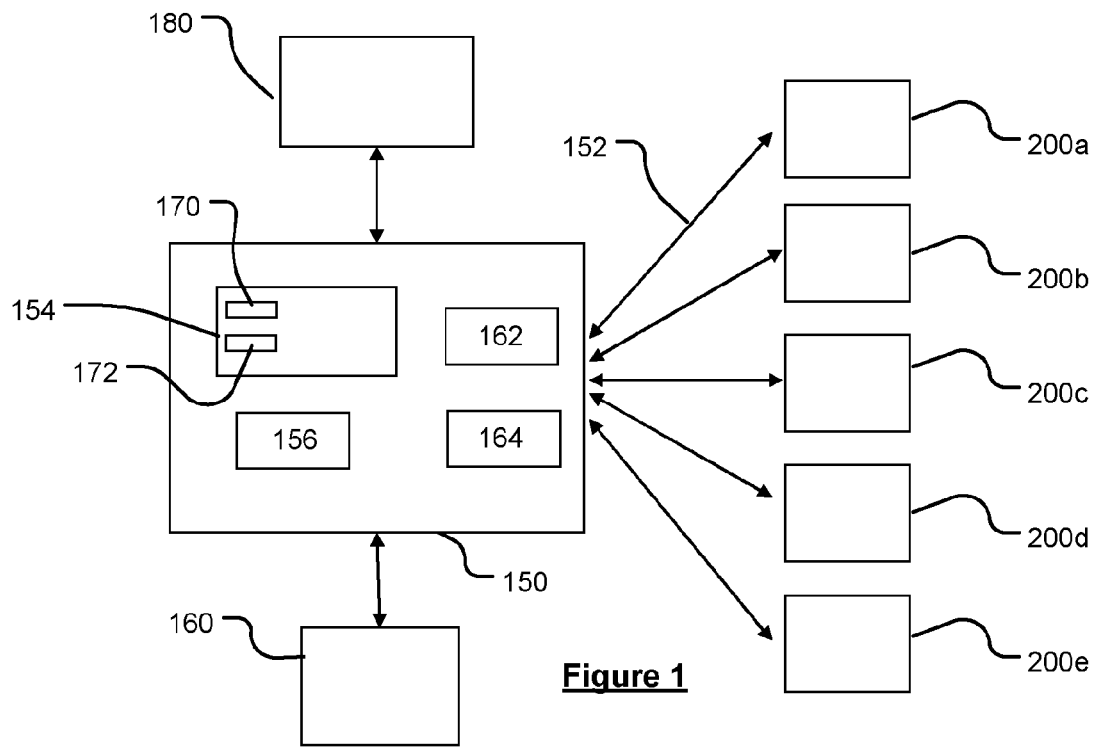
FIG. 1 is a schematic illustration of a navigation system according to an embodiment.

The first described embodiment, illustrated in FIG. 1, is directed to the determination of the effect of weather conditions on expected speed of travel and the transmission of speed data in the form of contour data to PNDs, which use the speed data to determine or modify routes to a destination and/or ETAs. The generation and transmission of the speed data is described but it will be understood that further embodiments are not limited to the generation and transmission of speed data, but relate generally to any type of contour data.

The system of FIG. 1 comprises a server 150 that is operable to communicate with a plurality of portable devices, for example PNDs 200a to 200e. Only five devices 200a to 200e are shown for clarity, but it will be understood that in practice many thousands, or more, devices may be in communication with the server 150.

In the embodiment of FIG. 1 the devices 200a to 200e are vehicle-mounted PNDs, that use Global Positioning System (GPS) technology to determine their positions, and that are able to perform navigation or mapping operations. The devices 200a to 200e are not limited to being PNDs and may be any suitable type of device with navigation functionality, for example a mobile phone or portable computer.

The server 150 includes a processor 154 operatively connected to a memory 156. In operation, software stored in server memory 156 is read by the processor 154 to load software modules or other software components that enable the processor 154, to perform various processing or communication functions. In the embodiment of FIG. 1, the software modules comprise a weather-dependent traffic modelling module 170 and a weather data processing module 172. The operation of the different modules will be described in more detail below.

The server 150 is further operatively connected to a mass data storage device 160. The mass storage device 160 contains a store of navigation data, and can again be a separate device from the server 150 or can be incorporated into the server 150. The mass data storage device 160 can be used to store probe data from the devices 200a to 200e.

The server 150 is also in operative communication with at least one source of weather data 180, for example a third party website or weather communication centre that provides a dedicated weather feed. The at least one source of weather data can, alternatively or additionally, comprise weather sensor(s), rain radar(s) or a computer performing model calculations. The server 150 communicates with the at least one source of weather data via any suitable communications channel, for example via Internet connection or via a dedicated wired or wireless connection.

The server 150 is able to collect and fuse localized, accurate weather information (including but not limited to current/forecast information on precipitation, temperature, wind condition, and regional severe-weather warnings like storm or road ice, etc.) from multiple sources if desired.

The processor 154 is operable to transmit and receive information to and from devices 200a to 200e via communications channel 152, for example via transmitter 162 and receiver 164. The signals sent and received may include data and/or other propagated signals. The transmitter 162 and receiver 164 may be selected or designed according to the communications requirement and communication technology used in the communication design for the navigation system. Further, it should be noted that the functions of the transmitter 162 and receiver 164 may be combined into a single transceiver.

In the normal course of operation of the navigation devices 200a to 200e, GPS data from the devices are regularly recorded (for example, each 5 seconds for some systems) as probe data on a logging device, usually in the form of a data logger module included on the portable navigation devices themselves.

As well as receiving and processing probe data received from the devices 200a to 200e, the server 150 can also provide data to the devices 200a to 200e, for example in the form of digital map data (for example, digital map data updated in view of received probe data), software upgrades, or traffic updates. It is a feature of the embodiment of FIG. 1 that the server 150 also provides weather-related data to the devices 200a to 200e, as will be described in more detail below. The weather-related data can be used by the devices to for example, modify an estimated time of arrival for a route in dependence on weather conditions or modify a route based on expected variations of speed due to weather conditions.

Although the communication channel 152 of the embodiment of FIG. 1 may comprise an internet connection, any suitable form of data channel can be used. The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications. As such, the communication channel 152 includes, but is not limited to, one or a combination of the following: electric circuits, electrical conductors such as wires and coaxial cables, fibre optic cables, converters, radio-frequency (RF) waves, the atmosphere, or free space. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications. Alternatively or additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), or Global System for Mobile Communications (GSM). Both digital and analogue signals can be transmitted through the communication channel 152. These signals may be modulated, encrypted and/or compressed.

Figure 2:
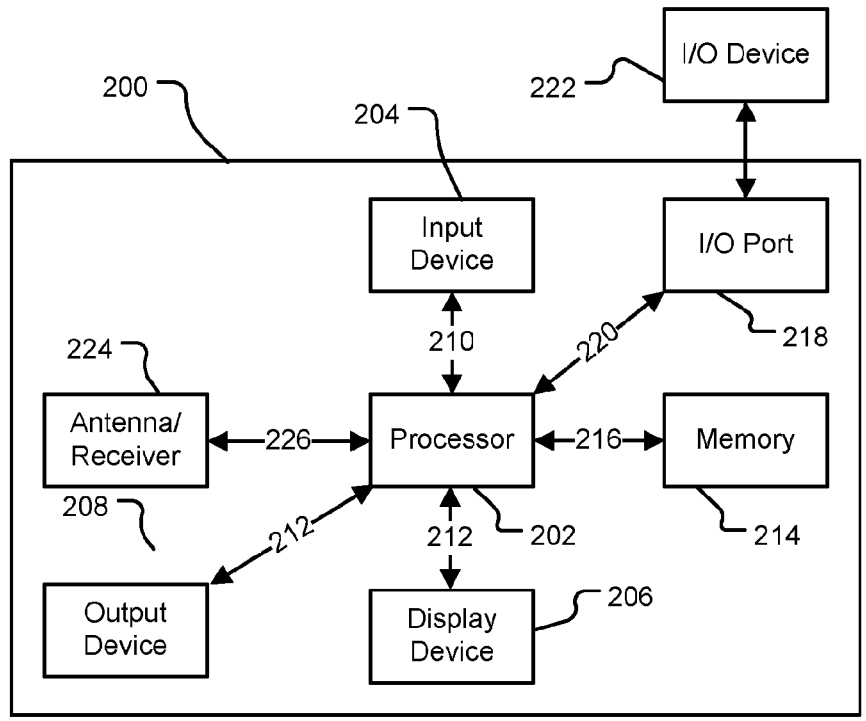
FIG. 2 is a schematic illustration of a navigation device according to an embodiment.

A navigation device 200 in one embodiment is illustrated in FIG. 2. The navigation device 200 is representative of any of the devices 200a to 200e shown in FIG. 1. It should be noted that the block diagram of the navigation device 200 is not inclusive of all components of the navigation device, but is only representative of many example components. The navigation device 200 is located within a housing (not shown). The navigation device 200 includes a processing resource comprising a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, the touch panel, and the display screen 206 are integrated so as to provide an integrated input and display device, including a touchpad or touchscreen input to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it is should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to, an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

Figure 3:
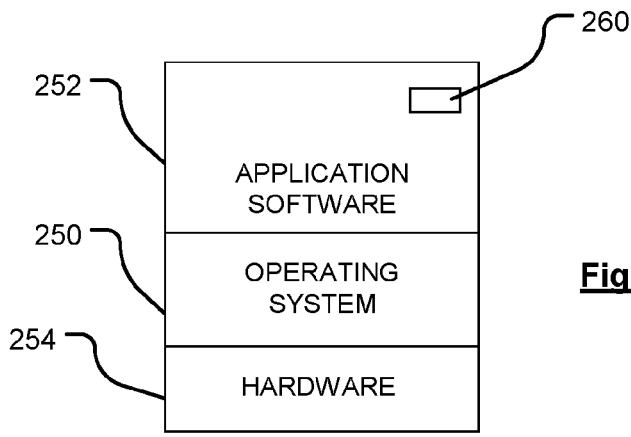
FIG. 3 is a schematic illustration of a processing resource of FIG. 2.

Referring now to FIG. 3 of the accompanying drawings, internal flash memory (not shown) of the device 200 stores a boot loader program that is executable by the processor 202 in order to load an operating system 250 and application software 252 from the storage device 214 for execution by functional hardware components 254, which provides an environment in which the application software 252 can run. The operating system 250 serves to control the functional hardware components and resides between the application software 252 and the functional hardware components 254.

The application software 252 provides an operational environment including a GUI that supports core functions of the navigation device 200, for example map viewing, route planning, navigation functions and any other functions associated therewith. The application software 252 is able to plan routes and determine the expected time of arrival at a destination based on expected speed of travel for each segment of a route, using known techniques. The expected speed of travel for each segment of road or other thoroughfares of a digital map can be stored as speed data in the device 200 and accessed when required. The speed data can be updated via speed data updates from the server 150.

When a user switches on the navigation device 200, the device 200 acquires a GPS fix and calculates (in a known manner) the current location of the navigation device 200. The user is then presented with a display showing in pseudo three-dimensions the local environment in which the navigation device 200 is determined to be located, and in a region of the display below the local environment a series of control and status messages.

By touching the display of the local environment, the navigation device 200 switches to display a series of virtual or soft buttons represented by icons by means of which a user can input a destination to which they wish to navigate, and perform various other functions relating to control of the navigation device 200 or display of data on the display.

It is a feature of the embodiment of FIG. 1, that the functions of the navigation device can be performed in dependence on weather-related data, for example received from the server 150. The application software 252 includes a data processing module 260 that is operable to perform or modify route calculation functions in dependence on received weather-related data, as described in more detail below.

Before describing the processing of the weather-related data at the devices 200, the processing of weather data by the server 150 to determine weather-dependent variations in traffic and the transmission of speed or weather data to the devices 200 is described.

Figure 4A:
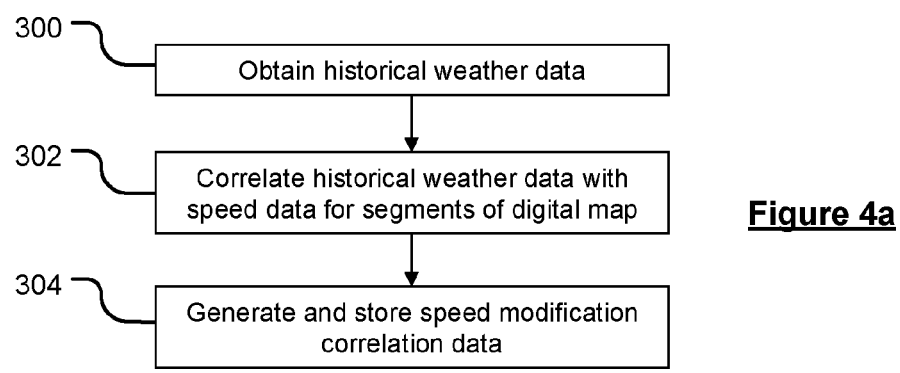
FIGS. 4a and 4b are flowcharts illustrating in overview the processing of weather data at a server of the system of FIG. 1 according to a first embodiment.

FIG. 4 is a flowchart illustrating in overview the processing of weather data at the server 150.

At the first stage 300 the server 150 obtains historical weather data representative of weather conditions for a region represented by digital map over a significant period of time, for example one year. The server 150 also has access to large quantities of probe data stored in the data store 160 and representing the movement of vehicles over roads or other thoroughfares represented by the digital map. The probe data can be processed to obtain, for example, one or more of the following: average vehicle speeds along individual road segments per time bin; traffic density on individual road segments per time bin (obtained for example from extrapolated and normalised density of navigation devices or from ultrasound distance detectors located at the front and back of vehicles); statistical spread of speeds for each road segment and time bin; jam probabilities for individual road segments and time bins.

The weather data can represent one or more different weather types, for example one or more of: presence or amount of precipitation such as rainfall, hail or snow; windspeed; wind direction; presence or amount of ice or lying snow; presence or amount of surface water; presence or amount of fog; visibility level; temperature. The weather data obtained from any suitable source, for example official weather records maintained by government or commercial agencies. Weather data from multiple sources may be used. Weather-related data obtained from suitably equipped individual vehicles can also be used in some embodiments. Such weather-related data obtained from individual vehicles can include for example data representative of slip events, operation of fog lamps, operation of windscreen wipers, temperature measurements, or rain detection.

The server 150 has access to a sufficiently large archive of weather data and probe data to allow statistically significant measurement of weather dependent speed averages and their significance. The modelling module 170 at the server 150 is configured to apply, at stage 302, correlation techniques to correlate variation in average speed for different segments of roads or other thoroughfares of the digital map with the variation in the or each weather condition. The modelling module 170 can also derive statistical correlations between weather conditions and, for example, jam probabilities, drivers' route preferences or any other traffic-related parameter if desired. The server 150 provides offline statistical analysis for calculating speed profiles and weather influence.

It has been found that a classification of different road types based on their sensitivity to weather conditions is useful in performing the correlation procedure. For example, precipitation intensity alone is often not sufficient as a parameter within some algebraic expression giving the average speed modification for all roads. The influence of precipitation can be non-linear and discontinuous in some cases, depending on the local traffic scenario and road layout.

In one mode of operation each road segment is classified to one of a plurality of road type classifiers (for example, 5, 10 or more different road type classifiers may be used). Each classifier may represent roads having one or more characteristics, for example width, number of carriageways, surface type, average speed or traffic volume under normal conditions, urban or rural location, proximity to traffic junction or traffic lights. Functional road classifications (FRCs) such as those used by TomTom International B.V. in their products may be used as the road classifiers. Each road segment may be assigned a classifier based on a priori assessment of properties of the road segment or, alternatively, each road segment may be assigned a classifier based on a posteriori determination of how speed properties of the segment vary with weather conditions. In that second case, each classifier may represent a respective level of sensitivity to at least one weather condition.

The number and types of classifications that are used can depend on the number of distinct reactions to weather conditions from different segments and the importance to traffic, and also on the limits of band-width for transmission of data to the devices 200*a* to 200*e* via channel 152, as in general the larger the number of classifications the larger the amount of data that needs to be transmitted to the devices. In one mode of operation, classification data representative of the classification of each road segment is stored as digital map data at the devices 200*a* to 200*e*.

For each classification, the reaction to different types and levels of weather conditions can be determined by correlating speed data for each segment of that classification with corresponding weather data representative of weather conditions at the road segment. Usually, the reaction represents modification, usually reduction, of speed with respect to a weather-unimpaired speed profile. Congestion estimations can usually be inferred via the time-dependent speed profile as a deviation of free-flow speed. The correlation process can be a time-dependent process, which correlates weather data and speed data obtained for the same time of day or week, thus taking into account expected daily or weekly variations in average speed for particular segments.

The correlation process can be used to determine average speeds as a function of precipitation and/or road condition, average speeds specific for FRC or other classifications under the weather condition, jam probabilities under the weather condition, and/or a classification of weather types with respect to average speed.

The correlation process results in the generation of weather reaction data for each road segment classification type representing the expected modification of average speed in response to weather conditions of one or more types and levels of severity.

It has been found that the variation of speed with severity of weather for each road segment classification type can be modelled effectively using a quantitative model, for example an exponential model in which the speed modification varies exponentially with the severity of a particular weather condition. The weather reaction data can be fitted to the selected model using known fitting techniques. Stages 302 to 304 are computationally costly and, in some modes of operation, are repeated only every 3 to 6 months or whenever a traffic engineer or other operator considers that changes that affect the results may have occurred.

Figure 4B:
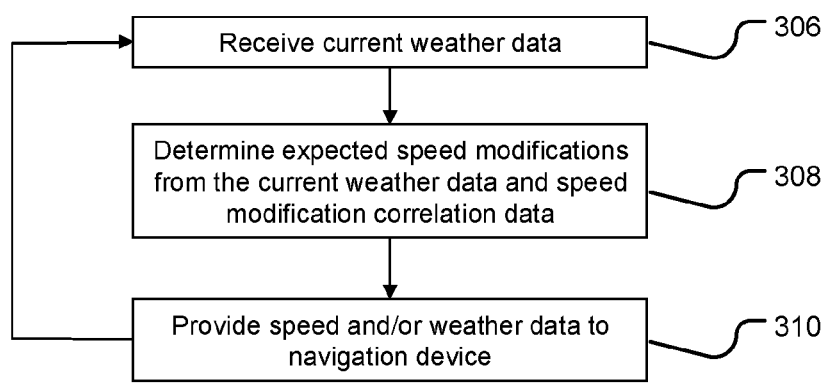

It is a feature of the described embodiment that speed modification factors for each road classification type and each location in a region can be calculated on-the-fly based on received weather data, as will now be described in more detail with reference to FIG. 4*b*.

In operation the server 150 receives current weather data at stage 306 from the weather data source 180 on a regular basis, for example every 15 minutes. The current weather data usually comprises a set of weather data comprising the most recent measured weather data and sets of forecast weather data representing forecast weather conditions for times in the future, for example at 15 minute intervals for three hours in the future.

Each set of weather data may comprise a plurality of data points, each data point representing a weather condition (for example rainfall level) at a respective location in a region. In some cases, the data points may correspond to regularly spaced positions across the region. In some embodiments, the weather data is in the form of text data or XML data, although any suitable data format can be used. In some cases, the set of weather data comprises or is used to generate a frame of weather data that can be used to display an image representing the weather condition for the region at a particular time.

In some modes of operation the server 150 may receive a plurality of sets of weather data each representing a different weather condition (for example rainfall, temperature, wind speed) at one particular time.

The weather data processing module 172 processes each received set of weather data for a selected weather type at stage 308 based upon the previously determined weather reaction data to determine a respective speed modification factor due to the actual or forecast weather condition at a particular time for each location in the region and for each road classification type. The speed modification factor for a particular road classification type and that location represents the expected modification of expected average speed of travel along a road of that road classification type at that location due to the weather condition.

Further sets of speed modification factor data may be produced for each weather type that is under consideration. In some modes of operation only a single weather type is considered, for example rainfall. If multiple weather types are considered, then the speed modification factor data for the different weather types may be combined, for example by taking the highest calculated speed modification factor for each location.

In the mode of operation that has been described, the reaction of a road segment, or a road segment type, to weather conditions is determined based upon correlation of historical probe data and historical weather data. Expected speed modification can then be determined for route segments for the current time and for future times, based upon the current or forecast weather and the historically-determined reaction of the road segments to weather conditions.

In some cases, the historical correlation takes into account short-term variations of weather conditions over time and associated changes in speed or other travel conditions.

For example, historical correlations can be used to determine the expected time for speeds for particular segments or road types to recover to normal following the end of a particular weather condition, for example following rainfall or snowfall. Such time-dependent historical correlations can be used to determine expected speed modification.

For instance, weather conditions may now be good or be expected to be good for a particular segment but if there has been rainfall or snowfall within a certain preceding period of time, it may be determined based on historical data that there is expected to be a speed modification, usually a speed reduction.

Such calculations can take into account a large number of different parameters. For example, the time taken for speeds to recover to normal following rainfall, snowfall, ice formation or other weather condition, may depend on how long the weather condition lasted, the severity of the weather condition, and other weather conditions in the intervening period since the weather condition ended. For example, the time take for speeds to recover to normal following snowfall may depend on the severity and length of the snowfall and on temperatures in the intervening period since the end of the snowfall. Such calculations can also depend on road classification type. For example, major roads may be found to recover more rapidly from snowfall or other conditions, which may be due to a variety of factors, for example the condition of the road surface, the amount of use of the road, and the increased likelihood that the road will be cleared by a snow plough or other road clearance equipment.

At the next stage 310, speed modification factor data is provided to one or more of the navigation devices 200a to 200e. In one mode of operation, the navigation device 200 transmits to the server 150 its location and route data representative of a selected route. The server 150 selects speed modification factor data for the immediate surroundings of the navigation device 200 and speed modification factor data for locations along the selected route and within a certain margin around it. The margin can be directionally dependent and can be adapted intelligently based on factors like the current wind speed and direction and on the actual or expected travelling speed of the device 200. The transmitted data comprises speed modification factor data to the current time as well as forecast speed modification factor data for a feasible period into the future. In combination, this enables the device 200 to take into account the relevant weather conditions along the individual segments of the route at the actual times when the vehicle in which the device 200 is installed will pass them, as will be described in more detail below.

In some variants of the embodiment, the server 150 selects speed modification factor data for transmission to the device 200 based on both the location of the device 200 and the route, and also on the expected time at which the device 200 will arrive at different segments of the route. Thus, for example, speed modification factor data for the current time for locations within a margin around the current location of the device 200 would be transmitted, but speed modification factor data for a time in the future for those locations may not be transmitted as the device 200 would be expected to be at a location further down the route by that future time.

By selecting only some of the speed modification factor data for transmission based on the location of the device 200 and/or the route the amount of data that needs to be transmitted can be reduced.

A further significant feature of the embodiment is that the speed modification factor data is processed further before transmission by the weather data processing module 172 in order to reduce the amount of data to be transmitted. The processing of the data in one mode of operation comprises representing the speed modification factor data by contour data and transmitting the contour data rather than the raw speed modification factor data to the device 200.

The weather data processing module 172 processes a set of speed modification factor data for a particular time and a particular road type classification to determine contours that represent the boundaries of areas which the speed modification factor has the same value. The contours may be nested contours, with one contour falling within another contour and delimiting the transition from an area having a speed modification factor of one value to an area having a speed modification factor of another value.

The processing module 172 then fits each contour to a shape and stores the data representative of the fit as contour data. The fitting can be performed using any suitable known fitting techniques, for example least-squares fitting. Any suitable shape can be used, but it has been found particularly efficient to fit each contour to a polygon shape. Alternatively, ellipse or rounded triangle shapes can be used, for example. The number of vertices of each polygon can be fixed in advance or can be selected during processing to ensure that a goodness of fit within a predetermined threshold is obtained.

The contour data comprises the coordinates of each of the vertices of the fitted polygon, together with a contour value representing the value of the speed modification factor represented by the contour.

Although the fitting of contours to the data has been described in relation to speed modification factor data, in other embodiments or variants, the contour fitting is performed on each set of weather data rather than on the speed modification factor data. The resulting weather contour data can then be processed, if desired, to determine speed modification factor contours using the speed modification model.

The processing of the sets of data to convert them into contour data is useful not just for the determination of speed modification factors, but also, for example for the efficient transmission of any suitably type of position-dependent data, for example weather-related data or other environmental data, such as weather data or speed modification factor data, to the devices 200a to 200e over a bandwidth limited communication path, for example for purposes of displaying weather movies on the devices.

Precipitation data, for example, typically can be represented as a moving and changing landscape of contour levels. The transmission of entire JPEG code frames for the purposes of display of weather data on a mobile device is wasteful since current radar technology allows resolution of only up to around 10 different precipitation levels. By transmitting contour data, for example denoting regions of equal precipitation, rather than raw weather data to bandwidth limited or processing capacity limited mobile devices the effective transmission of weather data for display, including weather movies, becomes feasible. The weather data can be used by mobile devices to display cloud, precipitation or other weather maps and movies. The mobile devices can also process the data to extract information or make qualified decisions.

In other embodiments, it is contemplated the weather data that is received by the server 150 comprises movie frames representing pixel-based images and the processing module 172 transforms the pixel-based images into contour polygons representing a reduced set of relevant precipitation levels. The contour data representative polygons (for example 2-D points representing longitude and latitude) can be transmitted to the mobile device.

It is a feature of the embodiment that, as well as generating contour data to represent data, for example weather-related data such as speed modification factor data or weather data, the processing module also tracks contours over time.

The processing module 172 performs the contour identification and fitting procedure for a plurality of datasets, each dataset representative of a different time, and then performs a further procedure to track contours between the different datasets. The tracking procedure comprises comparing the shape, size and position of contours between different datasets to determine which contours in the different datasets correspond to each other and for example represent the same area of weather at different times. Any suitable data comparison, correlation or fitting procedure can be used to determine which contours correspond to each other.

Figure 5:
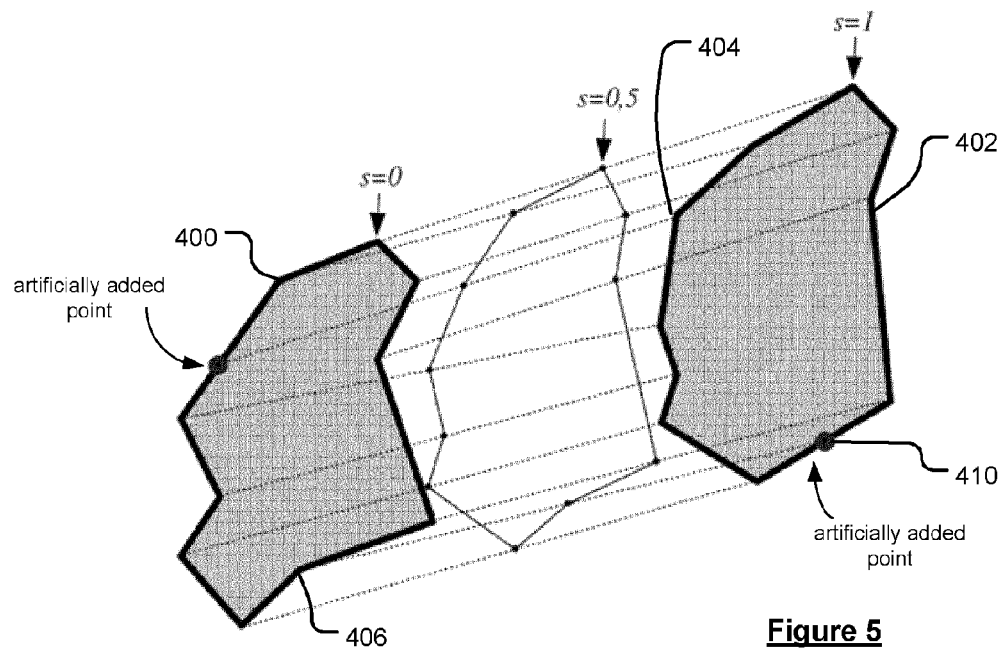
FIG. 5 is a plot showing two contours representing the same area of precipitation at different times.

By way of illustration, two contours 400 and 402 representing the same area of precipitation at different times, and obtained from different weather datasets, are shown in FIG. 5. The positions of the contours 400, 402 in the figure represent the relative positions of the areas of precipitation. The first contour 400 represented by an identifier value s=0 is representative of an area of precipitation at a time A. The second contour 402 represented by an identifier value s=1 is representative of the area of precipitation at a later time B.

The contour data representing the contours 400, 402 can be interpolated to obtain the shape and position of the contour at an intermediate time C=A+(B−A)/2 by interpolating the positions of corresponding vertices of the contours as illustrated schematically in FIG. 5. A linear interpolation of the vertices is indicated in FIG. 5 by dotted lines.

It can be seen in FIG. 5 that the shape of the contour has changed between time A and time B, with an additional vertex 404 towards the top left of the contour having appeared at time B, and a vertex 406 towards the bottom of the contour having disappeared between time A and time B.

In order to enable easier subsequent interpolation between the contour datasets 400, 402 the processing module 172 artificially adds contour data points representative of the appearing and disappearing vertices to the contour datasets.

The processing module can also include vertex identifiers in the contour datasets to identify corresponding vertices between the different contour datasets. For example, a vertex identifier identifies that vertex 406 for the contour dataset at time A corresponds to artificially added vertex 410 for the contour dataset at time B.

In some cases, a contour will disappear or appear between one frame or other dataset and the next frame or other dataset. The emergence or disappearance of contour can usually be detected by the failure of the processing module 172 to find a corresponding contour in the immediately following or preceding frame or other dataset.

In one mode of operation, a position of emergence or disappearance is assigned to the contour in the immediately following or preceding frame or other dataset. The position of emergence or disappearance can be determined from the expected movement of contours between datasets, for example determined from actual measured wind speeds or from the determined movement of other contours between the frames or other datasets.

Figure 6:
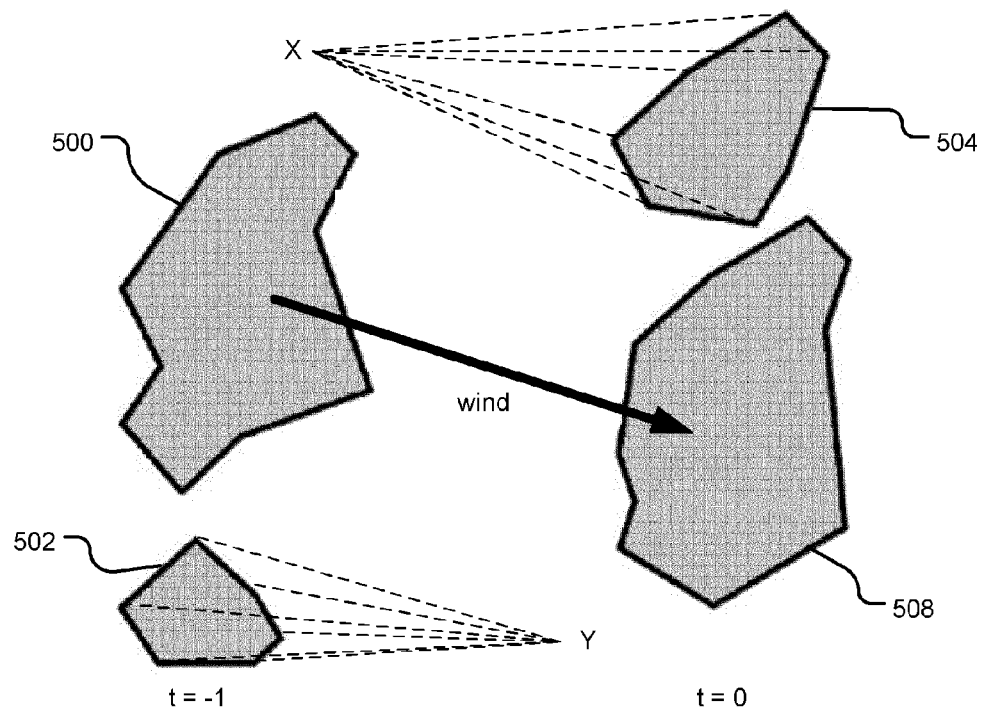
FIG. 6 is a plot showing the emergence and disappearance of contours at different times.

An illustration of the emergence and disappearance of contours is provided in FIG. 6, which shows contours present in a current frame (time, t=0) and in a previous frame (time, t=−1). There are two contours 500, 502 representative of areas of precipitation present in a previous frame, at time t=−1. In the current frame, one of the contours 502 has disappeared and a new contour 504 has appeared. Contour 500 is present in the current frame as contour 508 although its shape has changed. The contour has moved due to the prevailing wind conditions.

In this case, the processing module 172 firstly finds correspondences between contours of the different frames by using a local wind vector representative of the measured wind speed and associates contours that overlap best. Thus, in FIG. 6 it is identified that contour 500 corresponds to contour 508 and represents the same area of precipitation.

Next, the processing module 172 determines that any leftover contours (in either frame) have appeared or disappeared. The location X of origin of contour 504 at time t=−1 is determined by following the local wind vector one frame interval backwards. Likewise, the location Y of disappearance of contour 502 is determined by following the local wind vector one frame interval forwards. Data identifying the locations X and Y are included in the frames or other datasets for transmission to the mobile devices.

It is a feature of the embodiment of FIG. 1, in certain modes of operation, that the frames or datasets to be transmitted are selected to ensure that no contours both appear and disappear in between consecutive frames or other datasets. In such modes of operation, a plurality of frames of the datasets are processed, and a subset of those frames or other datasets are selected for transmission, thus reducing the transmission load. By selecting the frames for transmission appropriately it can be ensured that no significant contour features will be omitted entirely from the transmitted data, and that all significant contour features appear in at least one frame or other dataset, whilst also reducing the transmission load.

It is possible that contour 500 corresponds to contour 504 rather than contour 508. However, it is more plausible the contour 500 corresponds to contour 508 because they overlap best if transposed by the local wind vector, as determined by processing module 172. It is possible that less obvious situations may arise, in which there is ambiguity as to which contours correspond to each other. However the system only requires a plausible solution. If the alternatives are completely equivalent, for example the overlap similarities equal in all respects, then the correspondence could be chosen randomly as either choice would be equally consistent with radar or other weather measurements.

The processing module 172 is able to perform processes such as identification of corresponding contour shapes in different frames, emergence or disappearance of vertices and contours, changes in contour topology (for instance splitting or merging contours) for example by intelligently selecting contour datasets, consistently defining contours and storing or transmitting information on the correspondence between vertices and contours in adjacent frames or other datasets. By performing such processes at the server 150 the processing burden at the navigation devices 200a to 200e or other mobile devices can be reduced.

At the next stage of the process, the selected weather-related data, for example speed modification factor data or weather data is provided to the device 200. The transmission of speed modification factor data and subsequent processing of that data at the device 200 to determine an estimated time of arrival (ETA) and/or to determine or modify a route to a destination will now be described. The transmission of weather data and the processing of the weather data by the device 200 to display a weather movie will then be described.

Figure 7:
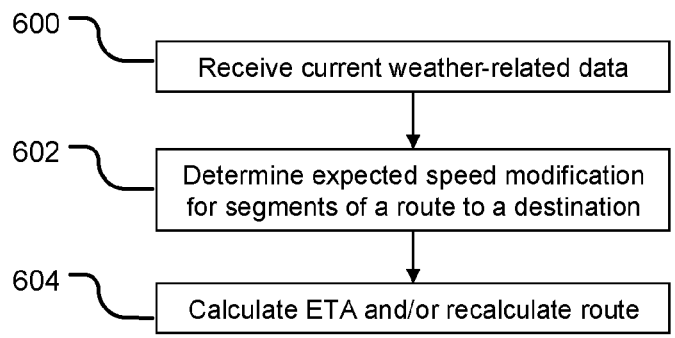
FIG. 7 is a flowchart showing in overview processes to determine or modify an ETA or a route to a destination based on received contour data.

FIG. 7 is a flowchart showing in overview processes performed by the device 200 to determine an ETA and/or to determine or modify a route to a destination based on received weather-related data.

At the first stage 600 the process, the device 200 receives current weather-related data. The current weather-related data in this case comprises a plurality of speed modification factor datasets. Each speed modification factor dataset comprises a set of speed modification factor data points, each set of data points corresponding to a particular time and to a particular road type classification. A separate speed modification factor dataset is transmitted for each time (for example, the current time and for three hours into the future at 15 minute increments) and for each road type classification.

The transmitted speed modification factor data represents expected speed modifications due to current weather conditions as well as due to the forecast weather for a feasible period into the future. This information enables the device to take into account relevant weather conditions along individual segments of the route at the actual times when the vehicle will pass them.

In practice, the speed modification factor datasets may not vary significantly between each predetermined interval, and in that case the processor 150 may transmit only updates to the previously transmitted datasets. For example, the processor 150 may only transmit new datasets for a particular time if the speed modification factor data for that time has altered by greater than a predetermined threshold since the previous transmission.

In the process of FIG. 7, as discussed, each received speed modification factor dataset comprises contour data, comprising vertex coordinates that represents the positions of vertices of contours representing areas of equal speed modification factor, contour identifiers identifying contours that represent areas of the same speed reduction factor, and vertex identifiers enabling the tracking of the corresponding contours between different datasets representing different times.

Furthermore, in the example described in relation to FIG. 7, contour data is only transmitted to the device 200 for regions within a predetermined margin of the route to a selected destination that has been calculated by the device 200. The device 200 has previously transmitted destination data, or route data representative of the route, to the server 150.

It can be understood that, by using contour data, by transmitting data for locations only within a predetermined margin distance of a calculated route, and by transmitting updated data only when required, the rate of data transmission to the device 200 can be kept within the available bandwidth. In variants of the described embodiment, those features can be provided alone or in any suitable combination.

The device 200 has already calculated a route to a selected destination using known techniques. The route comprises a plurality of connected segments and for each of those cases segments the device 200 determines an expected ETA at the segment, based on expected speeds of travel for each preceding segment of the route. The calculation of ETAs can be performed using speed data stored at the memory 214 of the device 200 using known techniques, such as those used in the TomTom IQ Routes® system.

The memory 214 of the device 200 also stores road type classification data, classifying each of the segments represented in the digital map to one of the classifications used by the server 150 to determine reaction to weather conditions.

The device 200, for each of the segments, reads classification data from the memory 214 to determine the road classification for that segment and then determines the received speed modification factor dataset that is relevant for that segment based on the calculated ETA at the segment. In one mode of operation, the device 200 determines the speed modification factor dataset that is representative of a time closest to the ETA at the segment, and uses that speed modification factor dataset for that segment.

In another mode of operation, the device 200 determines the speed modification factor datasets that immediately precede and immediately follow the ETA at the segment. The processing module 260 then performs an interpolation procedure to interpolate the position of corresponding contours represented in those preceding and following datasets. For example, the processing module 260 determines corresponding contour vertices in the preceding and following datasets using the vertex identifiers, and then performs a linear interpolation of the coordinates for those contour vertices.

The device 200 then determines a modified speed of travel for the segment by multiplying the stored expected speed of travel for that segment by the speed modification factor for that segment determined from the received weather-related data and representing the expected modification of speed of travel due to adverse weather conditions.

The device 200 then recalculates the ETA for the next segment of the route based on the modified expected speed of travel determined for the preceding segment or segments, and determines the expected speed modification for that next segment. The process is repeated for each segment of the route in succession.

At stage 604, once the process has been repeated for each segment of the route, the processing module 260 determines an ETA at the final destination. The ETA may then be displayed to the user. In some modes of operation, a message, or icon or other feature is also output to the user indicating that the ETA has been modified due to adverse weather conditions. The map display may indicate the intersection of the current route with the bad weather zone (which may, for example, be coloured red or any other suitable colour) plus the new route (which may be coloured differently to the existing route, for example coloured green).

In some modes of operation, the device 200 also determines whether to recalculate the optimum route to the destination, in view of expected speed modifications due to adverse weather conditions.

In normal operation the device 200 calculates many possible routes to a destination (depending on the destination and the number of routes available) and select the fastest route (that route providing the earliest expected ETA). In one mode of operation, the device 200 determines other possible routes to the destination periodically, as the vehicle travels along the selected route, and determines the expected ETA and time of travel to the destination for each of those routes under normal conditions.

If the modified ETA for the selected route is determined to be later than the ETAs under normal conditions for the other routes by a predetermined margin (for example, the ETA is more than 5 minutes or 10 minutes later, or the expected time of travel is more than 5% or 10% later), then the processing module 260 performs the expected speed modification procedure for one or more of the other possible routes to determine the expected ETA for those other routes. If the weather-modified expected ETA for one of the other routes is earlier than for the selected route then the selected route may be replaced by that other route that has an expected ETA (dependent on any route restrictions specified by the user) or a message may be displayed to the user giving them the option to switch to that other route.

In another mode of operation, the weather-modified expected speed of travel and ETA is performed for each of the possible routes each time new weather-related data is received.

In the described embodiment, the speed modification data comprises speed modification factor data that can be multiplied by the expected speed of travel under normal conditions to obtain expected speed of travel under the associated weather condition. However the speed modification data can be in any suitable form in alternative embodiments. For example, the speed modification data may represent an expected absolute modification of speed, or an expected absolute speed, under the associated weather condition.

In some cases, the received weather-related data indicates that a segment of a route is impassible, or may be impassible at some future times. In that case, the processing module 260 may exclude such segments from route calculations, and the selected route would avoid such segments.

In the described embodiment, the processing module 260 can exclude particular regions (not only single segments) from the route calculation if it is determined that severe weather conditions (for example, flooding or tornadoes) are current or expected. In some variants, the processing module 260 excludes certain road types (for example, minor roads) or provides less weighting to such road types in route calculations, if it is forecast that particular weather conditions may occur (for example, lying snow). Thus, major roads may be favoured if there is, for example, lying snow in anticipation that major roads may be subject to better or faster maintenance (for example, road clearing). In some case, particular roads or road types may be excluded or downgraded depending on the season as well as actual or forecast weather conditions. For example, in some countries, dry river beds may be used as roads in summer but may be expected to be impassible in winter.

Particular road classification types may alternatively or additionally be excluded from, or given less weighting, in route calculation or ETA calculation, in the case of actual or forecast weather conditions of a predetermined type or severity. For example, minor roads may be excluded or given less weighting in route calculations in the presence of particular actual or forecast weather conditions, for example snow. Thus, a vehicle may be routed away from minor roads to major roads in the case of actual or forecast snow even if the fastest route under normal conditions may be via minor roads. Similarly, in the presence of snow or other such weather conditions, a route calculation may maintain a route on major roads even if a traffic jam is known to be present on major roads which, under normal weather conditions, would cause a rerouting to minor roads.

The process of FIG. 7 has been described in relation to the receipt and processing of speed modification factor data. In other embodiments, the data transmitted from the server 150 is data representing the value of any other suitable parameter as a function of position, for example environmental data such as weather data that represents actual and/or expected weather conditions. Again, the data can be transmitted as contour data. However, in this mode of operation the speed modification factors are calculated at the device 200 from the weather data by the processing module 260. The process for calculating the speed modification factors from the weather data corresponds to that process when performed by the server.

It can be understood that in the described embodiments, effective modification of ETA and/or route selection based upon expected weather conditions can be achieved whilst also maintaining the rate of data transmission to the device 200 within available bandwidth.

Figure 8:
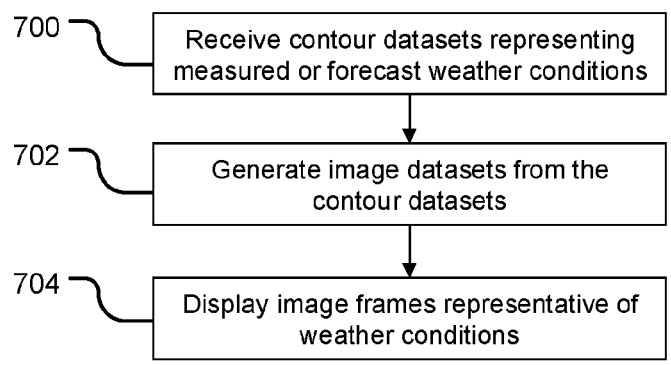
FIG. 8 is a flowchart illustrating in overview a process for displaying a weather movie.

The device 200 can also be used to display movies or other images based on the received data, for example weather movies. In embodiments for displaying weather movies, the received data comprises weather data instead of or as well as speed modification factor data. One such embodiment is described with reference to FIG. 8, which is a flowchart illustrating in overview a process for displaying a weather movie representing, in this case, rainfall. Any other position dependent parameter, for example any other weather condition, or combination of weather conditions, can be represented in alternative embodiments or modes of operation.

At the first stage 700 of the process contour datasets are received which represent measured and/or predicted rainfall level for a series of times, for example times at 15 minute increments covering a three-hour period. As already described, each contour dataset can comprise vertex coordinates and contour identifiers representing contours that represent areas of the same rainfall level. Contours can be nested one within another, to represent increasing levels of rainfall.

The processing module 260 processes each contour dataset to generate a frame of image data, for example a frame of JPEG or MPEG data, by in-filling each of the contours represented by the contour dataset with the rainfall level represented by the contour. In the case of nested contours, the processing module 260 in-fills each contour up to the boundary of a contour contained within it.

The device 200 is then able to display the frames of image data using known techniques. The frames of image data can be displayed in succession thereby to display a weather movie representing, in this case, the variation with time of measured and/or forecast rainfall level across a region.

In a variant of the embodiment illustrated in relation to FIG. 7, successive contour datasets are interpolated using an interpolation procedure to obtain intermediate contour data representative of rainfall at an intermediate time, and that intermediate contour data is also processed by the processing module 260 to generate a corresponding image frame. Thus, successive image frames or movies with time resolution greater than that of the received contour datasets can be obtained. The interpolation procedure may be the same as or similar to that already described in relation to the interpolation of speed modification factor contour datasets. For example, linear interpolation of contour vertex coordinates can be used to determine the position of contour vertices at the intermediate times.

In other embodiments, the contour datasets represent areas for which a weather warning or other localised weather condition information has been issued. In some such embodiments, a fixed fragmentation of an area (for example a country or continent) into meteorologically meaningful regions (also referred to as natural regions) that are expected, on average, to exhibit similar or homogeneous weather conditions is determined and stored at the server 150.

In such embodiments, data representing the fragmentation of the area is also stored at the device 200 in the form of labelled contour data, for example labelled polygon definitions comprising, for instance, vertex coordinates.

In operation, upon receipt of weather warning or other weather condition data, the server 150 transmits only the labels of the currently affected regions along with the respective weather conditions specification (for example, an identifier specifying that the weather warning relates to heavy rain, strong wind or other weather condition). A unique identifier may be assigned to a particular weather warning. When the weather warning becomes obsolete, the server 150 is able to transmit a corresponding message indicating that the weather warning represented by the identifier is no longer current.

In an alternative embodiment, the server 154 determines whether the same weather warning or other weather condition applies to multiple adjacent natural regions. The server then determines contour data representative of the outline of the adjacent natural regions merged together and transmits the contour data to the device 200. The device 200 then determines from the received contour data the area to which the weather warning applies.

Figure 9:
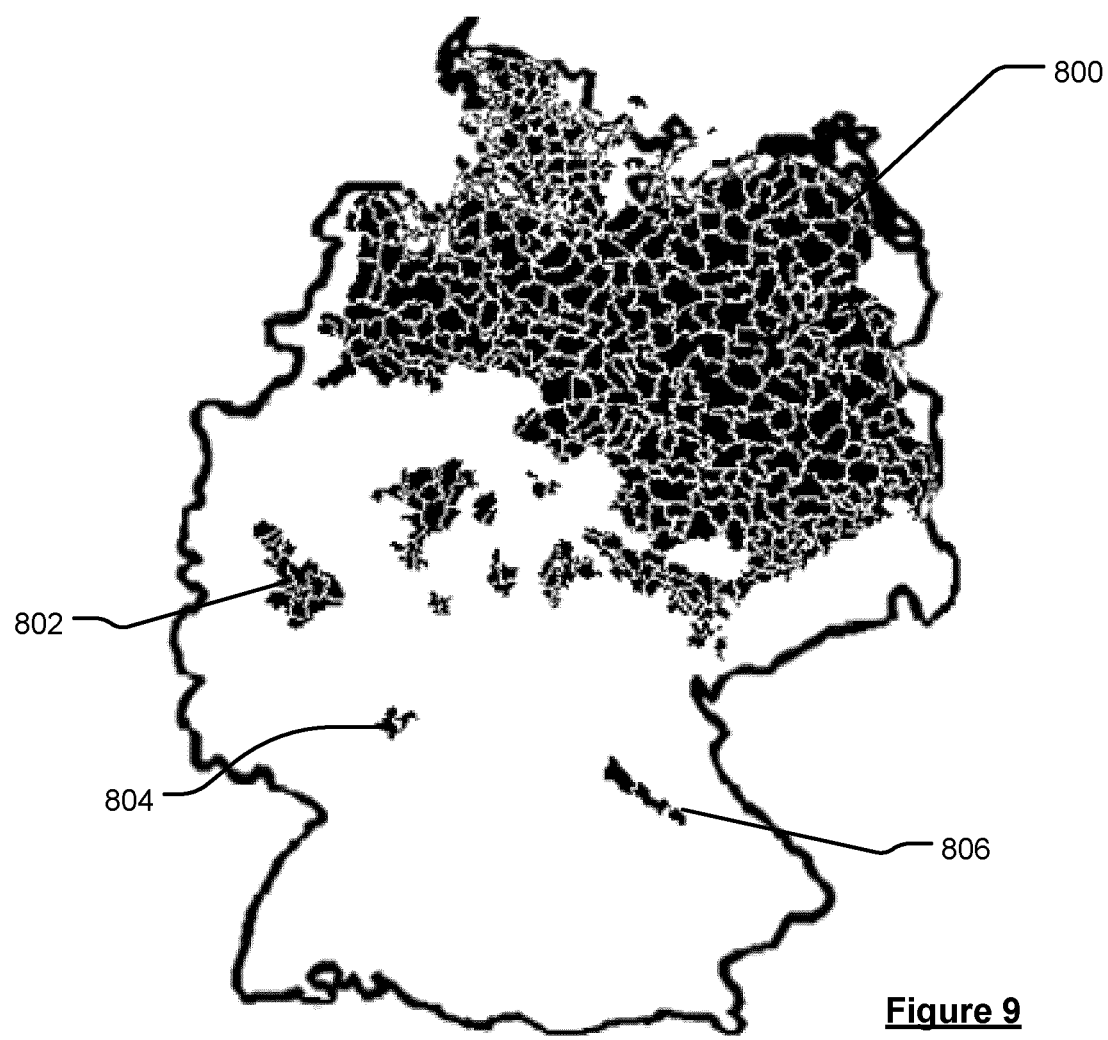
FIG. 9 is an image showing areas of a region for which a storm warning is current.

In a further alternative embodiment, the server decides on-the-fly for each area to which the weather warning or other weather condition applies whether it is more efficient (for example requires transmission of less data) to provide fixed region labels identifying the natural regions making up the area to which the warning or condition applies, or to provide contour co-ordinate data representing the area. The latter is likely to be more efficient when a large number of natural regions form an area with a simple shape. For example, in FIG. 9 a storm warning is current for areas 800, 802, 804 and 806 of Germany. In this case, contour coordinates are transmitted to the device 200 representing area 800 which comprises a large number of contiguous natural regions, whereas natural region labels are transmitted to the device 200 representing areas 802, 804 and 806 (and other similar regions) which are made up of a smaller number of natural regions.

The embodiment of FIG. 1 has been described in relation to the generation, transmission and processing of weather-related data, for example weather data such as rainfall data or speed data representing the variation of expected speeds with weather conditions. However, embodiments are not limited to the generation, transmission and processing of such weather-related data. Any suitable type of data may be processed to produce contour data for transmission and processing. The use of contours can be particularly valuable in relation to position dependent parameter data in which areas of a region have substantially the same parameter value. Examples of such parameters include, for example, weather data as already described, other environmental data such as pollution level, sea temperature, presence or absence of oil, gas mineral or other deposit, presence or absence of vegetation, presence or absence of buildings and other map data. It can be particularly useful to model using contours parameters that are subject to regular change, particularly if it is necessary to transmit data concerning the parameters over a bandwidth limited link, as the use of contours provides an efficient way of reducing the amount of data to be transmitted whilst retaining desired information.

The embodiment of FIG. 1 has so far been described in relation to the generation, transmission and use of contour data. It is also contemplated, however, in other embodiments of the invention that data, such as weather data or other environmental data, which is representative of the variation of the value of a variable with location can be processed at the server 150 to determine a plurality of parameter values of a model. The parameter values or a subset thereof, rather than the modelled data itself, are then transmitted to the mobile devices thus again reducing the amount of data transmitted to the mobile devices 200a-200e. The application software 252 at the mobile device 200, in such embodiments, can include a processing module, e.g. similar to module 260 (shown in FIG. 3), for obtaining the values of the variable or variables from the received parameter values.

Figure 10:
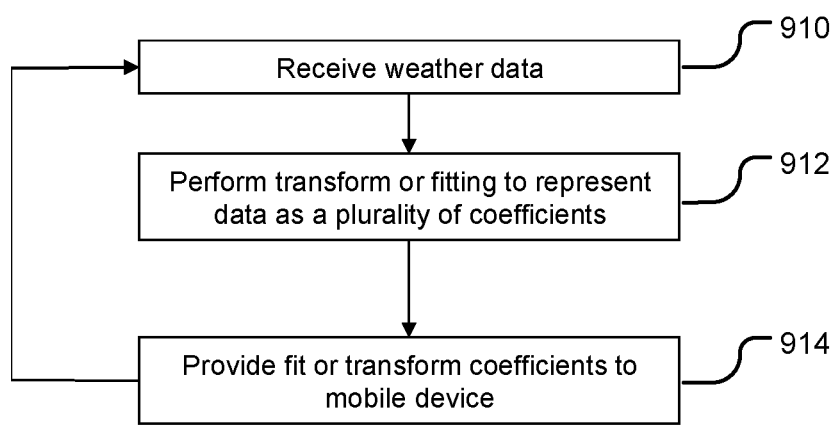
FIG. 10 is a flowchart illustrating in overview a mode of operation of the system of FIG. 1 according to a second embodiment.

Operation of this embodiment is illustrated in overview in the flowchart of FIG. 10.

At the first stage 910 of the process, the server 150 receives current weather from the weather data source 180 as described above in relation to stage 306 of FIG. 4b. In the process described, the weather data is rainfall data, although any other type of weather data can be used.

At the next stage 912, the weather processing module 172 performs a transform or fitting thereby to represent the received weather data as a plurality of parameter values. Any suitable fitting or transform can be used, depending on properties of the data, as will be described in more detail below. For example, in the mode of operation now described in relation to FIG. 10, a Fourier transform is used.

The processing module 172 determines the number of data sets, T, included in the received current weather data. Each weather data set comprises an array P of data points of size m×n.

The processing module 172 stacks the arrays P of the data sets to a three-dimensional array PP. The stacking of the arrays produces a three-dimensional array PP that represents complex, non-convex shapes of equal precipitation levels. As we are dealing with time and space the data can be reinterpreted as three-dimensional volumetric discrete data, for example a cube with values $f(x,y,z)$. Optionally, the processing module 174 performs a smoothing process on the three-dimensional array PP to ensure sufficiently smooth level transitions from one two-dimensional array P to the next two-dimensional array P.

Next, the processing module 172 performs a fast Fourier transform (FFT) procedure, thereby to fit the three dimensional data to a set of Fourier coefficients. The FFT procedure can be performed using standard Fourier library functions. In alternative embodiments any suitable Fourier transform, or indeed any other transform or fitting procedure can be used. Embodiments are not limited to the use of FFTs. For example, a discrete n-dimensional Fourier transform may be used.

The output of the FFT procedure is a set of Fourier coefficients that represents the three-dimensional data set PP comprising the weather data as a function of time and position. The set of Fourier coefficients can be used to reconstruct the set of weather data, and to extract weather data for any selected time or position.

The processing module 172 then performs a filtering process in which it selects some of the Fourier coefficients and discards other of the Fourier coefficients. In one mode of operation the processing module 172 selects those coefficients c that have a magnitude greater than a threshold value. In another mode of operation the processing module 172 selects coefficients for the first W of the N terms of the Fourier transform, where W is a threshold value. In a further mode of operation, an optimisation process is performed to select those coefficients that can best represent the data, subject to a constraint on the number of coefficients and/or on the quality of representation of the data. Any other suitable filtering or selection process can be used.

Figure 11A:
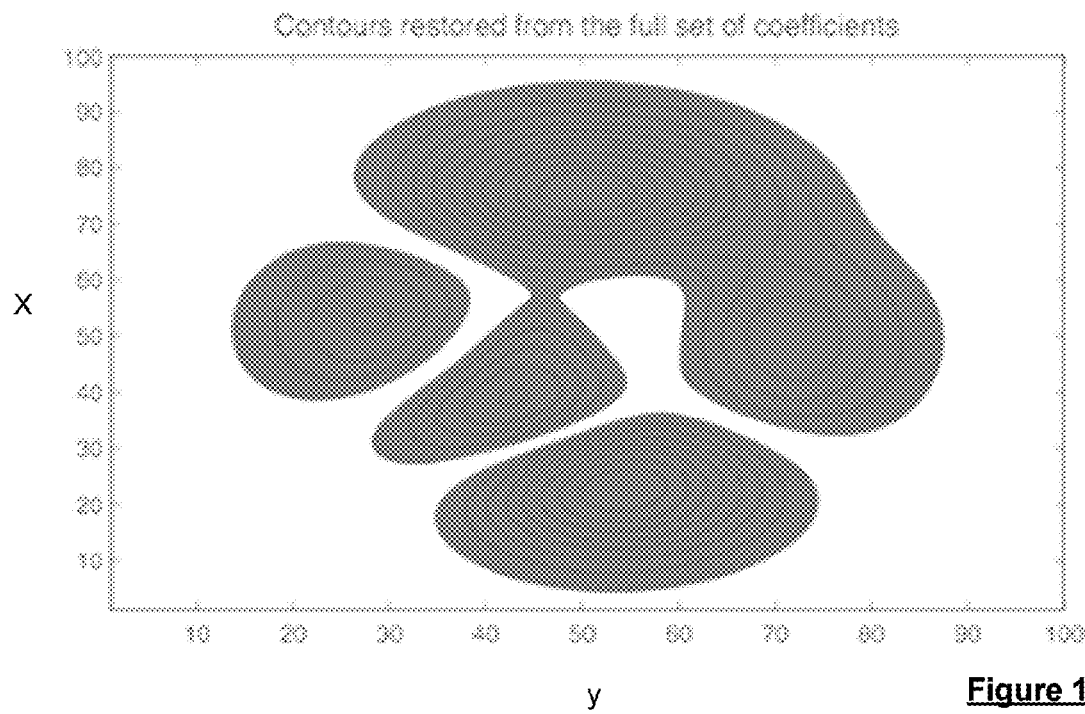
FIG. 11a is a plot showing precipitation as a function of position at a particular time.
Figure 11B:
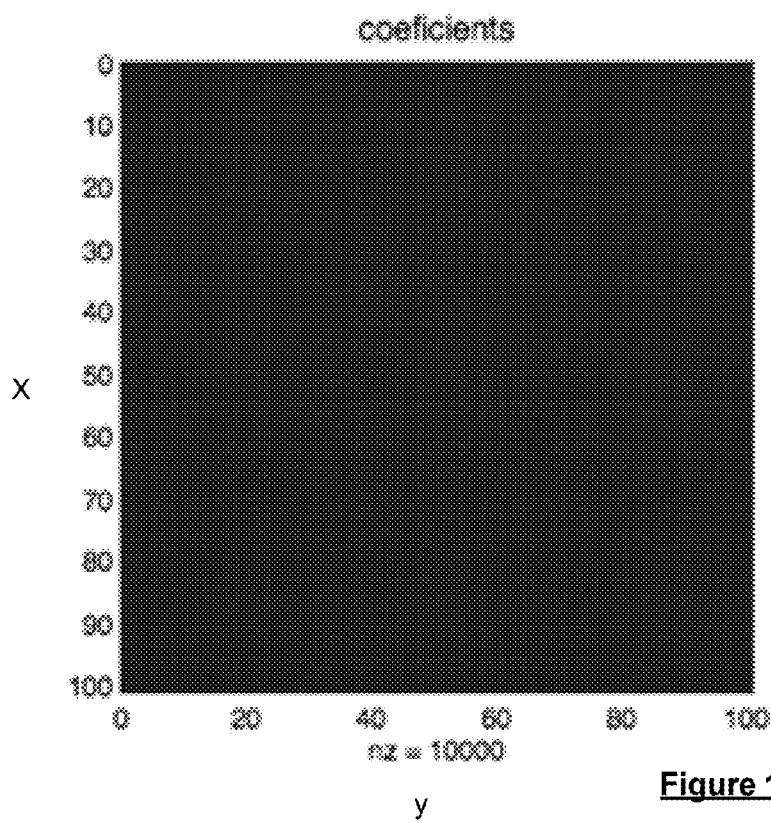

By way of illustration, FIG. 11a is a plot of a single data set showing precipitation as a function of position at a single time. The plot includes contours that represent different rainfall levels. The FFT procedure is performed on the data set and FIG. 11b is a plot illustrating those Fourier coefficients that have been selected following the filtering process. In this case, all Fourier coefficients are selected and effectively no filtering has been performed.

Figure 12A:
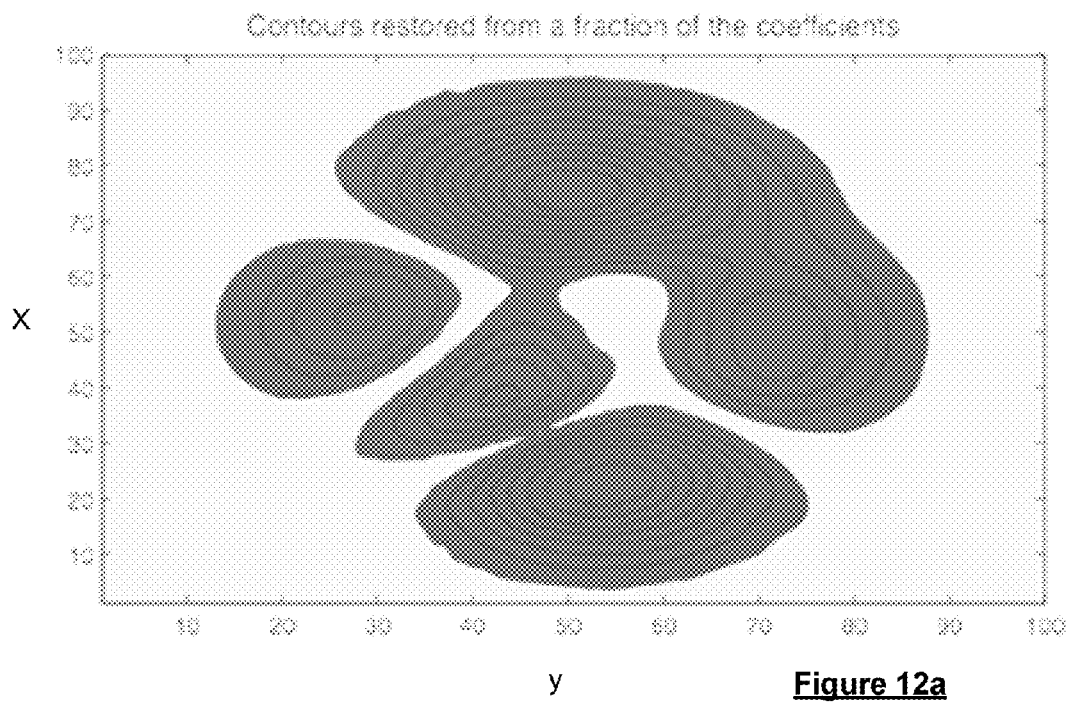
FIG. 12a is a plot showing precipitation as a function of position, obtained following an inverse Fourier transform procedure performed on selected Fourier coefficients.
Figure 12B:
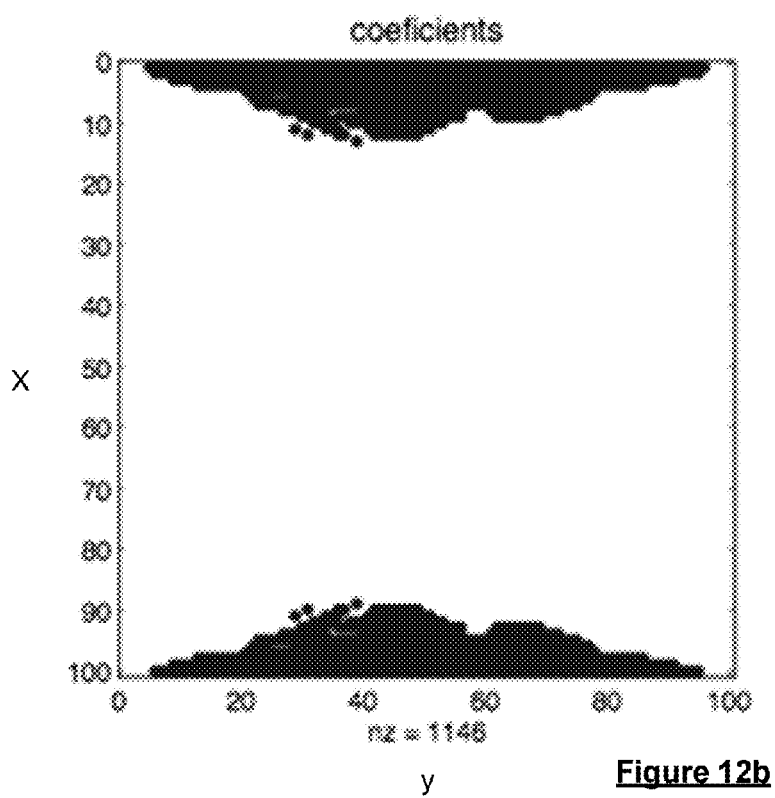

FIG. 12b is a plot illustrating those Fourier coefficients that have been selected following a further filtering process to select only those coefficients that have a magnitude greater than 2.8. It can be seen from FIG. 12b that a large number of the coefficients have been discarded, and in this case the filtering provides a compression ratio of 8.72.

FIG. 12a is a plot of precipitation data extracted by performing an inverse FFT using only the selected coefficients. It can be seen that there are some minor differences between the original data set of FIG. 11a and the reconstructed data set of FIG. 12a. For example, there are some slight ripples in one of the contours of FIG. 12a that are not present in the corresponding contour of FIG. 11a. However, for the purposes of, for example, displaying weather movies or providing weather data for traffic or individual purposes, small distortions present in the reconstructed data are negligible and the Fourier transform and filtering processes do not produce any significant losses. The example of FIGS. 11 and 12 relates to a two-dimensional data set, for clarity of display of the results. However, similar results are obtained for three-dimensional data sets.

The selected Fourier coefficients are then, at stage 914, transmitted to one or more mobile devices, for example the portable navigation device 200. The filtering process to be used to select coefficients for transmission to the devices can be selected in dependence on the properties of the data in question and/or in dependence on the available bandwidth for transmission to the devices. For example the number of coefficients that are selected for transmission can be varied in dependence on the available bandwidth.

At the next stage, the Fourier coefficients are received at the navigation device 200. The processing module 260 performs an inverse FFT to extract three-dimensional weather data representing rainfall as a function of position and time. Known library functions or routines can be used to perform the inverse FFT. The processing module 260 is able to extract weather data for any selected position or time from the received Fourier coefficients, not only for the times represented by the original weather data sets.

In the process of FIG. 10, the processing module 260 uses the inverse FFT procedure to extract a series of data sets, each data set representing rainfall as a function of position across the region at a respective time. The extraction of each data set can be considered as the taking of a slice through a three-dimensional data set. The processing module 260 is then able for example, to generate an image frame from each extracted data set. The image frames can be used by the device 200 to display a weather movie represented by the image frames on the display 206 in accordance with known techniques.

The use of the Fourier transform process, and the filtering or other selection of the coefficients, results in a significant reduction of the amount of data that is needed to be transmitted to the mobile devices, for example portable navigation devices, to represent weather data on those devices, for example in the form of weather movies. For many applications that require transmission of weather-related data to mobile devices, the exact value of the weather data at any particular individual pixel may not be critical. Thus, considerable truncation or other filtering of the coefficients can be performed without significant loss in performance.

The process of FIG. 10 is described in relation to the transmission of rainfall data, but the process can be used to transmit any weather-related or environmental data or indeed any two-dimensional or three-dimensional data set having suitable properties.

Figure 13:
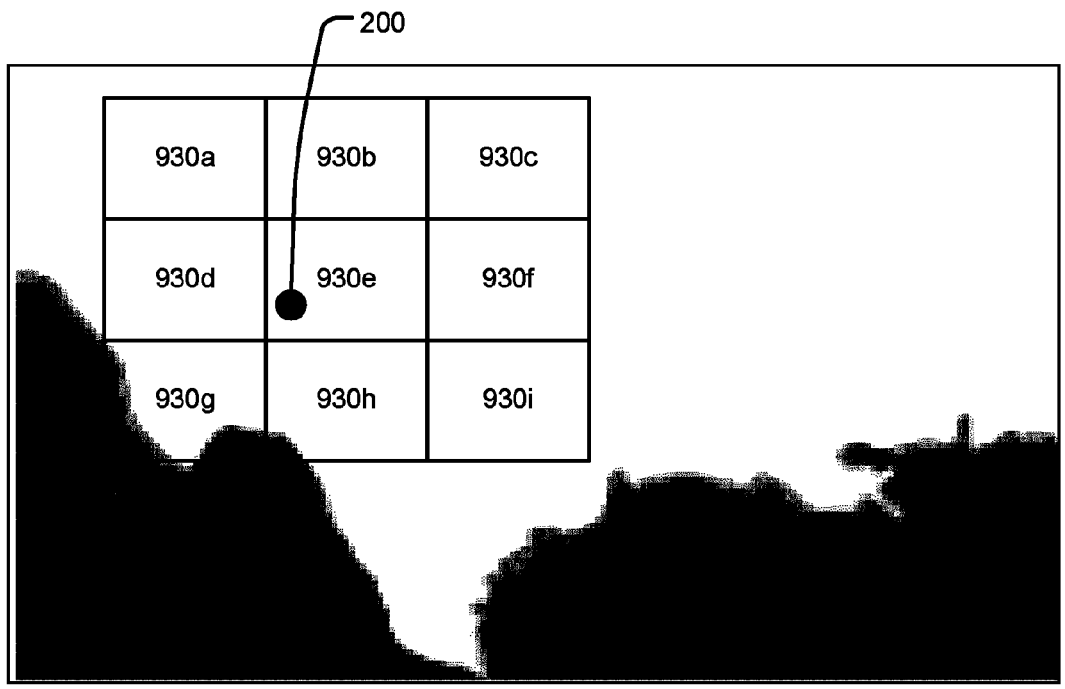
FIG. 13 is an image of a region showing sub-regions for which separate Fourier transform procedures are performed.

The Fourier transform and filtering process has been described with reference to FIG. 10 in relation to single sets of weather data representing the weather for an entire region (for example across an entire continent) at a particular time. In practice, a user of the navigation device or other mobile device may only need to receive weather data for an area in the vicinity of the location of the device or, for example, for an area around a planned route. Therefore, in some embodiments separate Fourier transform and filtering processes are performed on subsets of the weather data comprising weather data for selected sub-regions FIG. 13 is an illustration showing nine different sub-regions 930a-930i. A separate Fourier transform and filtering process is performed separately on weather data for each of the sub-regions, to produce nine different sets of selected Fourier coefficients. The location of a portable navigation device 200 is also indicated in FIG. 13. The portable navigation device 200 transmits its location to the server 150 and the server 150 selects the set of Fourier coefficients for the sub-region 930e in which the device is located and transmits those Fourier coefficients to the device 200. Weather data can be extracted by the device 200 from the received Fourier coefficients as already described. By transmitting only Fourier coefficients for a sub-region or sub-regions of relevance to a particular device the amount of data transmitted to the device can be reduced still further.

In practice, in the example described in relation to FIG. 13, the server 150 would in one mode of operation transmit four sets of Fourier coefficients, for sub-regions 930d, 930e, 930g, 930h, as the device 200 is close to the boundary of those four sub-regions. Although transmission of the four sets of Fourier coefficients can still provide a reduction in the amount of data transmitted to the device 200, the combining of the extracted weather data at the device 200 can be computationally cumbersome in some circumstances.

In practice the server 150 may be dealing with thousands or millions of active devices spread over the Earth. However, in the situation illustrated in FIG. 13 each set of Fourier coefficients represent weather data for only a single sub-region. Fourier coefficients for more than one sub-region may need to be transmitted if the device is close to a boundary between sub-regions. Fourier coefficients for many more sub-regions may need to be transmitted if the user of the device wishes to view or otherwise use weather data for a region larger than a single one of the sub-regions. Furthermore, to reduce the amount of data to be transmitted requires a sufficiently dense tiling of the sub-regions, but the smaller the size of the sub-regions the greater the probability that multiple neighbouring sets of weather data or images must be combined at the device 200, which can be computationally cumbersome as discussed.

Figure 14:
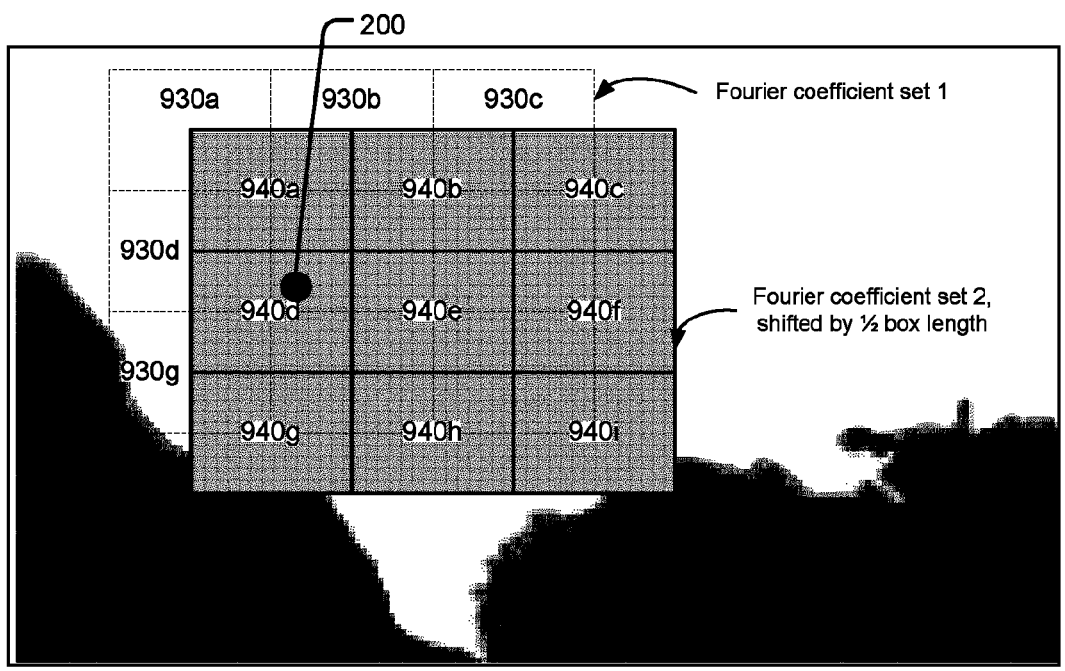
FIG. 14 is an image of a region showing two, shifted sets of sub-regions.

Operation of a further embodiment is described in relation to FIG. 14. In this case, the region is divided into two sets of sub-regions. Each set of sub-regions provides a tiling of the region, but each set is shifted against the other set by half of the length of a sub-region in x and y directions (or longitudinal and latitudinal directions). In FIG. 14, two sets of sub-regions 930a-930i and 940a-940i are shown.

In operation of the embodiment described in relation to FIG. 14, the device 200 again provides its location to the server 150. The server 150 then selects a sub-region within which the device 200 is located. There will be two sub-regions within which the device is located, in this case sub-regions 930e and 940d. The server 150 then selects the one of those two sub-regions for which the device is most distant from the boundary of the sub-region, in this case sub-region 940d. The server 150 then transmits the selected Fourier coefficients for the selected sub-region 940d to the device 200. The server 150 also transmits data representing the position, shape and size of the selected sub-region, or an identifier of the selected sub-region 940d enabling the navigation device 200 to determine the position, shape and size of the sub-region 940d. The device 200 is able to extract weather data for the sub-region 940d using an inverse FFT as already described.

In the embodiment of FIG. 14, the sub-regions of the different tilings are shifted by half a linear dimension (length or width) of a sub-region with respect to each other. However any suitable shift sizes can be used. For example in some embodiments there are three tilings, with sub-regions of each tiling being shifted by one third of a linear dimension of the sub-region. The pre-calculation of different sets of Fourier or other coefficients for different sub-regions for each update of weather information is readily achievable, given the computational power and memory available at the server 150.

The choice of the size of the sub-regions can be made by an operator at the server 150. The size of the sub-regions can also be referred to as a zoom level. Clearly, once the weather data is extracted at the device 200, the user at the device 200 can choose to display a subset of the extracted data, for example to zoom in further.

Different users often have different zoom level requirements. For example, a user of a device 200 may wish to view or otherwise use weather data for a continent or country as a whole, or may wish to view or otherwise use weather data for a specific region around the device 200. In some embodiments the amount of data to be transmitted to the devices 200 can be reduced by performing the Fourier transform and filtering or other selection processes at the server 150 for sub-regions of different sizes (and thus for different zoom levels). An example of the operation of such an embodiment is illustrated in FIG. 15.

Figure 15:
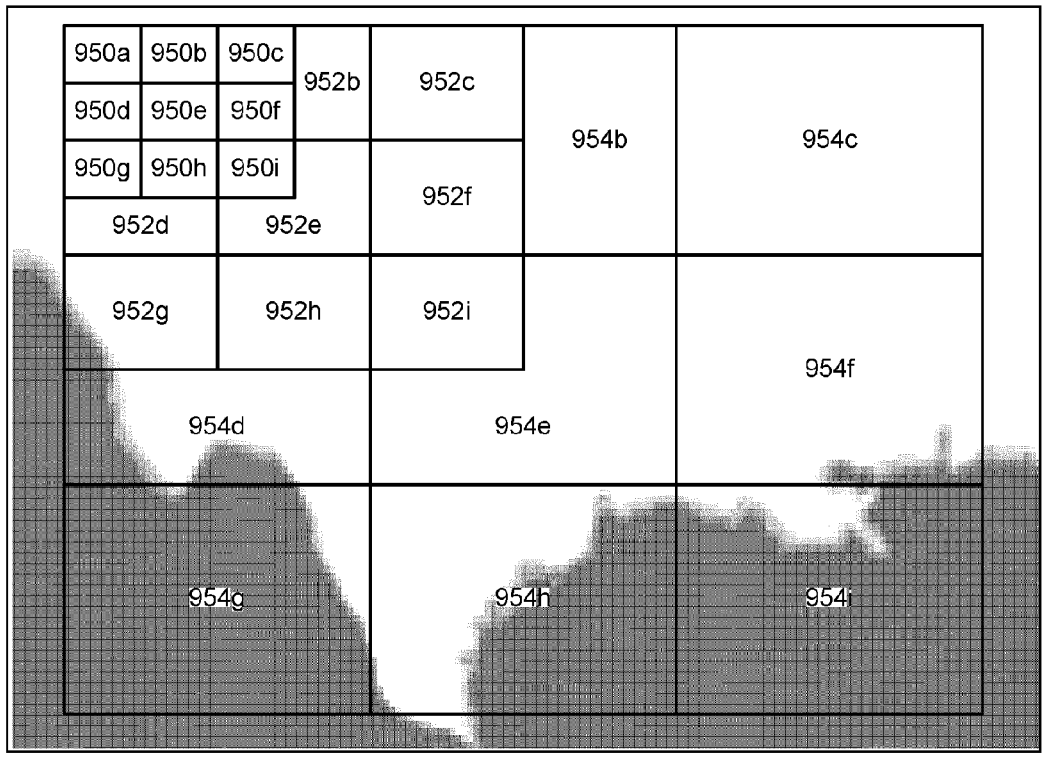
FIG. 15 is an image of a region showing three sets of sub-regions of different sizes.

In FIG. 15, a region is tiled with different sets of sub-regions, each set of sub-regions having sub-regions of different sizes/different zoom levels. In the case of FIG. 15, there are three separate tilings each with sub-regions of different sizes. The three separate tilings are represented by sub-regions 950a-950i, 952a-952i and 954a-954i. Not all of the sub-regions of the tilings are shown, for clarity.

The server 150 determines the location of each device 200 and the zoom level required by that device 200, usually from data received from the device 200. In some cases a default zoom level may be set for each particular device, for example based on device type or previous user requests or settings for that device. The server 150 then selects the sub-region that most closely matches the device location and zoom level and transmits the selected Fourier coefficients for that sub-region to the device 200. The server 150 may also transmit a sub-region identifier and/or data representing the size and shape of the sub-region. The device 200 is able to extract weather data using an inverse Fourier transform procedure as already described.

In some cases, the server 150 may select a sub-region having a size/zoom level slightly smaller than that requested by the device 200 in order to avoid transmitting coefficients data for more than one sub-region.

In further embodiments, the server 150 calculates and selects Fourier coefficients for sub-region tilings having different sizes/zoom levels such as those described in relation to FIG. 15 and for shifts of those sub-region tilings such as those described in relation to FIG. 14. The server 150 selects the best sub-region for a particular device 200 based on the position of the device and/or requested zoom level from amongst the different tilings.

In alternative modes of operation, the server 150 may select a sub-region in respect of which to transmit Fourier coefficient data to a particular device based on data other than the current location of the device 200. For example, a user of the device 200 may request, via device 200, the data for another location than that at which the device is currently located. Alternatively or additionally, the server 150 may transmit coefficient data for sub-regions covering all locations along, and optionally within a predetermined margin of, a route to a selected destination of the navigation device 200.

In other alternative embodiments, below a certain density of data requests in time and space, coefficient sets are calculated individually for each device 200, on demand. This can give optimal data compression. In such embodiments the server 150 must be able to calculate, select and transmit the Fourier coefficients for each region or sub-region individually requested by devices within the period before the next weather update. If the server 150 is not able to achieve that target then it becomes more efficient to compute Fourier coefficients for predetermined tilings as already described. In such embodiments, the server 150 can switch between calculation of coefficients individually for each requesting device and calculation of coefficients for predetermined tilings in dependence on the level of demand. The level of demand is monitored periodically or continuously by the server 150. For regions where consistently few devices are present (for example central Australia, or Siberia) it is possible that on-demand calculation of coefficients will always be used.

Operation of this embodiment has been described with reference to the processing and transmission of weather data to the device 200. However, any suitable type of data, may be processed and transmitted. In some embodiments, the Fourier transform and selection processes are performed, for example, on speed modification factor data rather than raw weather data. In such embodiments, the device 200 is able to extract the speed modification factor data for a relevant sub-region or sub-regions by applying an inverse Fourier transform process. The speed modification factor data can then be used by the device 200, for example as discussed above in relation to FIG. 7, to determine or amend ETAs or routes.

In one mode of operation, server 150 determines Fourier coefficients for sets of speed modification factor data for different areas that a tile a region, in similar fashion to that described in relation to weather data. The navigation device 200 transmits to the server 150 its location and route data representative of a selected route. The server 150 selects one or more sets of Fourier coefficient data for transmission to the device 200 that correspond to areas that encompass the immediate surroundings of the navigation device 200 and locations along the selected route and within a certain margin around it. The margin can be directionally dependent and can be adapted intelligently based on factors like the current wind speed and direction and on the actual or expected travelling speed of the device 200.

Figure 16:
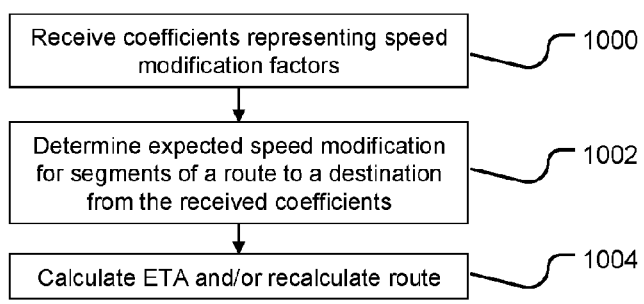
FIG. 16 is a flowchart showing in overview processes to determine or modify an ETA or a route to a destination based on received coefficients.

FIG. 16 is a flowchart showing in overview processes performed by the device 200 to determine an ETA and/or to determine or modify a route to a destination based on received coefficients representative of weather-related data.

At the first stage 1000 the process, the device 200 receives the selected Fourier coefficients representing a combined, three dimensional (time and position in x and y directions) speed modification factor data set for each road classification type. The device 200, for each of the segments, reads classification data from the memory 214 to determine the road classification for that segment and then performs an inverse Fourier transform procedure on the appropriate received set of Fourier coefficients to extract the speed modification factor data sets for that classification for one or more times.

The device 200 has already calculated a route to a selected destination using known techniques. The route comprises a plurality of connected segments and for each of those cases segments the device 200 determines an expected ETA at the segment, based on expected speeds of travel for each preceding segment of the route. The calculation of ETAs can be performed using speed data stored at the memory 214 of the device 200 using known techniques, such as those used in the TomTom IQ Routes® system.

The memory 214 of the device 200 also stores road type classification data, classifying each of the segments represented in the digital map to one of the classifications used by the server 150 to determine reaction to weather conditions.

The device 200, for each of the segments, reads classification data from the memory 214 to determine the road classification for that segment and then determines the speed modification factor that is relevant for the position and ETA at that segment, by reading the speed modification factor from the extracted speed modification factor data sets.

The device 200 then, at stage 1002, determines a modified speed of travel for the segment by multiplying the stored expected speed of travel for that segment by the speed modification factor for that segment determined from the received coefficients and representing the expected modification in speed of travel due to adverse weather conditions.

The device 200 then recalculates the ETA at the next segment of the route based on the reduced expected speed of travel determined for the preceding segment or segments, and determines the expected speed modification for that next segment. The process is repeated for each segment of the route in succession.

At stage 1004, once the process has been repeated for each segment of the route, the processing module 260 determines an ETA at the final destination. The ETA may then be displayed to the user. In some modes of operation, a message, or icon or other feature is also output to the user indicating that the ETA has been modified due to adverse weather conditions. The map display may indicate the intersection of the current route with the bad weather zone (which may, for example, be coloured red or any other suitable colour) plus the new route (which may be coloured differently to the existing route, for example coloured green).

In an alternative mode of operation, the inverse Fourier transform procedure is performed to extract speed modification factor data only for particular specified times and positions corresponding to segments of the route, rather than performing the inverse Fourier transform procedure to extract entire speed modification factor data sets.

As will be appreciated, the embodiment of FIG. 16 can include any or all of the optional features described in relation to FIG. 7. For example, the received coefficients may be used to exclude or decrease weighting applied to one or more types of road segments.

In the above described embodiments, the processor 150 performs a Fourier transform process to represent the three-dimensional data using Fourier coefficients, and the device 200 performs an inverse Fourier transform process to extract data from the selected Fourier coefficients.

The use of a Fourier representation can be particularly suitable as the original three-dimensional function can be approximately reconstructed to a sufficient degree by only a subset of the original Fourier coefficients. In some modes of operation, based on the assumption that the original function is sufficiently smooth and therefore effectively band limited, it is possible to retain only the coefficients up to a maximum frequency in order to yield the desired compression.

The Fourier representation has the advantage of providing a complete orthonormal basis of the function space and involving well-established mathematics. The transformation of a function into Fourier coefficients is straightforward and is guaranteed to yield well-defined results for all well-behaved and non-pathological cases. Furthermore, the assumption of being effectively band limited applies to a rather general range of reasonably smooth functions rendering this approach feasible for a broad spectrum of potential applications.

The features of the Fourier transform approach that make it particularly suitable for many applications also apply to wavelet transforms, and in alternative embodiments or alternative modes of operation the server 150 uses a wavelet transform process rather than a Fourier transform process to determine the coefficients. Similarly the device 200 in such embodiments or modes of operation is configured to perform an inverse wavelet transform to extract the weather-related data or other data from the selected coefficients.

Alternative embodiments use transforms, fittings or other parametric representations instead of Fourier wavelet transforms, to obtain parameter values that represent the location-dependent variable or variables. More specific prior knowledge of the characteristics of the function to be compressed motivate different representations that can allow for an even stronger compression for the purposes of a particular application. Targeting a more specific type of function, and alternative parametric representations need not be complete, i.e. it does not have to be able to construct every possible function to infinite precision. Rather, it is sufficient in practice that the typically expected target functions for a particular application can be approximated to the required degree. Furthermore, the parametrization does not have to be linear as in the Fourier case as long as feasible approaches for the transformation to and from the parameter space are available.

For example, in some embodiments or modes of operation the volumetric data is modelled by linear superposition of a fixed and finite set of 3-D Gaussian functions with different, but fixed, covariance matrices. For approximate reconstruction, only the scale weights and three-dimensional positions for a small subset of these bases functions are used. Alternatively, other suitable smooth volumetric functions can be used in place of Gaussian functions. An important aspect of this approach is that since the composition is linear, finding the optimal representation (for example using a least square error approach) of the original function can be achieved with the given set of basis functions can readily be obtained using straightforward linear algebra methodology.

Furthermore, reducing the complexity of such approximation can be achieved using standard methods for principal component analysis (PCA) such as the singular value decomposition (SPD) approach (this corresponds to applying a threshold to the coefficients in the Fourier based approach). Depending on the characteristics of the typical target function, a large library of basis functions may be required in order to achieve a desired accuracy. An advantage of the approach is that a reconstruction of the approximate function by the device 200 merely needs to linearly combine the (spatially translated) values of a fixed set of basis functions that can for example be stored in the form of simple lookup tables. The computational complexity of the reconstruction performed at the client device 200 is thus low.

In a further alternative embodiment, the volumetric data can be modelled by linear superposition of a variable number of 3-D Gaussians of variable covariance matrix and position, whereby the number, covariance matrices, and positions of the Gaussians are selected to optimally matched the individual function at hand. In comparison to the embodiment described in the preceding paragraph the achievable accuracy of the representation is not limited by the choice of a finite set of basis functions. More precisely, since the number, positions and covariance matrices of the Gaussians are optimised for the given volumetric data, the accuracy of the approximation can be expected to be better and the number of Gaussians required is likely to be smaller than for the embodiment of the preceding paragraph. However, finding the optimal representation of a given target function according to the scheme is mathematically more involved, since the model is nonlinear in the coefficients of the covariance matrices and depends on the number of Gaussians. Nevertheless, since the problem is similar to, for example, the modelling of multimodal probability density in the field of statistical data analysis, numerous approaches from that area can be adapted for this application, such as for example the mean shift approach to finding a suitable number of Gaussians (cluster centres) and a modified k-means algorithm for determining the optimal positions of the Gaussians (cluster centres). Furthermore, the class of expectation-maximisation (EM) algorithms provides a general frame framework for performing parameter fits of the envisaged kind, and other iterative, nonlinear optimisation algorithms are applicable as well in further embodiments.

In contrast to the Fourier or wavelet transform approach, a further reduction of the representation's parametric complexity cannot easily be achieved a posteriori. Instead a limitation on the number of Gaussians allowed to model the original data is imposed during the fitting step. In the case of reconstruction of the data from the functions, the device 200 is configured to compute the values of Gaussian functions with variable covariance. The computational complexity of the reconstruction is thus higher than is the case for embodiments that use Gaussian functions with fixed covariance.

In some embodiments the server 150 and the device 200 are configured to use any of the described approaches for transforming or fitting the data, and for subsequently extracting the data. The approach to be used can be selected either manually or automatically in dependence on properties of the data and/or in dependence on which approach provides the best fit.

As will be appreciated, the above described embodiments are able to reinterpret the time domain as a third dimension and treat the available two-dimensional frames or other data sets as slices through a three-dimensional volumetric function, and to represent that volumetric function in a parametric form that allows the definition of a suitable approximation of the original data with lower parametric complexity.

The more one knows about characteristics or empirical behaviour of the data and its typical use the better the compression that can be obtained. Several aspects can be considered, for example data granularity; data alphabet; Shannon entropy of atomic components; what representation allows the most optimal choice of a basis; is it worth defining a global basis and only transferring parameter values (the basis can then be as large as desired) or should the basis be transferred along with data (basis should then be optimal in size); can the basis be computed or even represented as a mathematical object; is the computation fast enough, does it require too much memory; what is the ratio of computational power between server and device; must the data be transferred losslessly or not. The combined compression of two chunks of data always improves the compression. An exception to that rule occurs in the case of compression of random and statistically independent data. The term basis is meant in the mathematical sense. The rotation of a matrix to approximate a representation in m principal components (if possible) reduces the data from $n^2$ to mn components. A small random matrix cannot be compressed in the average. A sufficiently large random matrix can be compressed to its eigenvalues (reduction from $n^2$ to n components) since the entire information about the statistical properties is completely coded in the eigenvalues. A similar approach is taken in the Fourier or wavelet transform of wave-like or sufficiently smooth discrete data which can often be found in images. Wave-likeness of data is a priori not known, but in the case of precipitation maps wavelike behaviour is evident as there are no hard angles or long straight lines and the changes from one typical meteorologically meaningful timeframe to the next are small.

Embodiments described herein provide an efficient way of transmitting weather-related data or other suitable data to navigation devices, smart phones and any other suitable mobile devices over bandwidth limited connections. The embodiments can exploit properties of combined frames or other data sets rather than compressing or transmitting such frames or other data sets individually. The data can be transmitted to any mobile device with a screen enabling the viewing of weather image data, or to any other type of mobile device that has processing capacity to process the received data to extract information or make qualified decisions.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, embodiments are not limited to using satellite-based systems but could readily function using ground-based beacons, inertial sensors, or any other kind of system that enables the device to determine its geographic location.

Whilst in embodiments described herein particular functionality is described as being provided at a server and other functionality is described as being provided at a device, for example at a PND or other mobile device, in alternative embodiments any of the described functionality can be provided at either a server or at a device. For example substantially all of the functionality is provided at a server in some embodiments, in which the server may operate as a navigation device. In other embodiments substantially all of the functionality is provided at a device, which may receive weather or other data directly from a source of such data rather than from the server.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

Whilst particular modules have been described herein, in alternative embodiments functionality of one or more of those modules can be provided by a single module or other component, or functionality provided by a single module can be provided by two or more modules or other components in combination.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A server system for providing data to at least one mobile device, the server system comprising:
   a memory storage; and
   a processing unit coupled to the memory storage, wherein the processing unit is operative to:
   obtain data that represents the variation of a speed modification parameter as a function of location at a plurality of different times, wherein the speed modification parameter is representative of an expected modification to an average speed of travel due to weather or other environmental conditions; and
   process the data to generate at least one data set for transmission to a mobile device, the generating comprising adding, to each data set, contour data for at least one contour that represents a boundary of a respective area for which the speed modification parameter has substantially a same value, the contour data comprising coordinates of vertices and/or edges of a polygon that represents the at least one contour, and the contour data configured to be used by the mobile device to compute, for the at least one contour, the respective area in which all of a plurality of road segments are to have a corresponding average speed modified using a same speed modification parameter; and
   transmit the generated contour data to the mobile device;
   a communications channel for transmitting the at least one data set to the mobile device;
   wherein the communications channel is operable to receive time and location data from the mobile device identifying at least a time and one location and the processing unit is configured to obtain the at least one data set in dependence on the identified time and location.

2. A server system according to claim 1 further comprising obtaining weather data representative of at least one of actual and expected weather conditions as a function of location.

3. A server system according to claim 1, wherein the obtained data represents the variation of the speed modification parameter as a function of location at a plurality of different times, and the processing unit is operative to process the data to obtain a plurality of data sets, each data set representing the variation of the speed modification parameter as a function of location at a respective, different time.

4. A server system according to claim 3, wherein the processing unit is operative to compare contour data for a first one of the data sets representative of the value of the speed modification parameter as a function of location at a first time and a second one of the data sets representative of the value of the speed modification parameter as a function of location at a second time, and to identify contour data in the second data set representing a contour that corresponds to a contour represented by contour data in the first data set.

5. A server system according to claim 4, wherein the processing unit is operative to include contour identifiers in the data sets that identify the corresponding contours.

6. A server system according to claim 4, wherein the processing unit is operative to compare at least one of shape, size, position or overlap of at least one contour of the first data set and at least one contour of the second data set to determine corresponding contours.

7. A server system according to claim 4, wherein the processing unit is operative to determine expected movement or other change of the contours between the first time and the second time.

8. A server system according to claim 4, wherein the processing unit is operative to determine expected movement or other change of the contours between the first time and the second time based on predicted or actual wind speed and/or wind direction.

9. A server system according to claim 4, wherein the processing unit is operative to identify a contour represented by contour data in the first data set for which there is not a corresponding contour represented by contour data in the second data set, to assign at least one of a location and time for the appearance or disappearance of the contour, and to store an identifier representative of the at least one of a location and time of appearance or disappearance.

10. A server system according to claim 9, wherein the location of appearance or disappearance of the contour is determined in dependence on expected movement or other change of the contours between the first time and the second time.

11. A server system according to claim 3, wherein the processing unit is operative to obtain the plurality of data sets, to determine changes in the contour data between data sets, and to select at least one of the data sets for transmission to the at least one mobile device in dependence on the determined changes between data sets.

12. A server system according to claim 11, wherein the processing unit is operative to omit a data set if changes in the contour data between the data set and a preceding data set, or between data set and a subsequent data set, are below a predetermined level.

13. A server system according to claim 11, wherein the processing unit is operative to select data sets to ensure that no contours both appear and disappear from the plurality of data sets at times between consecutive selected data sets.

14. A mobile device, comprising:
   a communication channel for transmitting and receiving data, wherein the communications channel is configured to transmit time and location data identifying at least one location and to receive at least one data set that represents a value of a speed modification parameter as a function of location at a plurality of different times in response to the transmitted location data, wherein the speed modification parameter is representative of an expected modification to an average speed of travel associated with road segments within a digital map due to weather or other environmental conditions; and a processing unit for processing the received at least one data set, wherein:

the at least one data set comprises contour data that represents at least one contour, each contour representing a boundary of a respective area for which the speed modification parameter has substantially the same value, the contour data comprising coordinates of vertices and/or edges of a polygon that represents the at least one contour, and the contour data configured to be used by the mobile device to compute, for the at least one contour, the respective area in which all of a plurality of road segments are to have a corresponding average speed modified using a same speed modification parameter; and the processing unit is configured to process the contour data to determine the value of the speed modification parameter for the at least one location at an associated time, wherein processing the contour data comprises computing, for the at least one contour, the respective area, and determining, based on the respective area, the value of the speed modification parameter for the at least one location.

15. A device according to claim 14, wherein the speed modification parameter is representative of at least one of actual and expected weather conditions as a function of location.

16. A device according to claim 14, wherein the at least one data set comprises a plurality of data sets, each data set representative of the value of the speed modification parameter as a function of location at a respective, different time, and each data set comprising contour data.

17. A device according to claim 16, wherein each data set comprises at least one contour identifier, each contour identifier identifying respective contour data, and the processing unit is configured to determine using the at least one contour identifier contour data in a second data set that corresponds to contour data in a first data set.

18. A device according to claim 16, wherein the processing unit is configured to process each data set to generate a corresponding image frame, wherein each image frame represents the speed modification parameter as a function of location at a respective, different time.

19. A device according to claim 18, wherein the processing unit is configured to provide the image frames to a display device for display of the image frames in sequence.

20. A device according to claim 16, wherein the processing unit is configured to interpolate contour data from a first of the data sets representative of the value of the speed modification parameter as a function of location at a first time, and corresponding contour data from a second of the data sets representative of the value of the speed modification parameter as a function of location at a second, different time.

21. A device according to claim 20, wherein the processing unit is configured to obtain, from the interpolation, interpolated data corresponding to a third time between the first time and the second time.

22. A non-transitory computer readable medium comprising computer readable instructions which, when executed by a processing unit of a mobile device, cause the mobile device to:

transmit location data identifying at least a time and one location;

receive at least one data set that represents a value of a speed modification parameter as a function of location in response to the transmitted location data, wherein the speed modification parameter is representative of an expected modification to an average speed of travel associated with road segments within a digital map due to weather or other environmental conditions, and wherein the at least one data set comprises contour data that represents at least one contour, each contour representing a boundary of a respective area for which the speed modification parameter has substantially the same value, the contour data comprising coordinates of vertices and/or edges of a polygon that represents the at least one contour, and the contour data configured to be used by the mobile device to compute the respective area in which all of a plurality of road segments are to have a corresponding average speed modified using a same speed modification parameter; and process the contour data to determine the value of the speed modification parameter for at least one location and an associated time, wherein processing the contour data comprises computing, for the at least one contour, the respective area, and determining, based on the respective area, the value of the speed modification parameter for at least one location.

23. The device according to claim 14, wherein the device recalculates a route based on the received at least one data set.

24. The server according to claim 1, wherein the server transmits the generated contour data to the mobile device if the speed modification parameter exceeds previously transmitted speed modification parameter by a predetermined threshold.

25. The computer readable medium of claim 22 further comprising providing an output on the mobile device based on the speed modification parameter.

* * * * *